United States Patent
Winzinger et al.

(10) Patent No.: US 10,875,725 B2
(45) Date of Patent: Dec. 29, 2020

(54) CONVEYING STORAGE DEVICE AND CORRESPONDING METHOD

(71) Applicant: Krones AG, Neutraubling (DE)

(72) Inventors: Frank Winzinger, Regensburg (DE); Konrad Senn, Alteglofsheim (DE); Arthur Binder, Pfatter (DE); Johann Huettner, Mallersdorf-Pfaffenberg (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/630,844

(22) PCT Filed: Jul. 15, 2018

(86) PCT No.: PCT/EP2018/069268
§ 371 (c)(1),
(2) Date: Jan. 13, 2020

(87) PCT Pub. No.: WO2019/012155
PCT Pub. Date: Jan. 17, 2019

(65) Prior Publication Data
US 2020/0140207 A1 May 7, 2020

(30) Foreign Application Priority Data

Jul. 14, 2017 (DE) .................. 10 2017 212 125

(51) Int. Cl.
*B65G 47/51* (2006.01)
*B65G 67/00* (2006.01)
(Continued)

(52) U.S. Cl.
CPC ........ *B65G 47/5113* (2013.01); *B65G 37/005* (2013.01); *B65G 47/682* (2013.01);
(Continued)

(58) Field of Classification Search
CPC .............. B65G 37/005; B65G 47/5113; B65G 47/682; B65G 47/766
(Continued)

(56) References Cited

U.S. PATENT DOCUMENTS

| 3,110,383 A | 11/1963 | Holben |
| 6,182,812 B1 * | 2/2001 | Hartness, III ...... B65G 47/5131 |
| | | 198/364 |

(Continued)

FOREIGN PATENT DOCUMENTS

| DE | 20221468 U1 | 1/2006 |
| DE | 60021735 T2 | 4/2006 |

(Continued)

OTHER PUBLICATIONS

International Search Report and Written Opinion of International Patent Application No. PCT/EP2018/069268 dated Oct. 25, 2018, with English translation, 25 pages.

*Primary Examiner* — Douglas A Hess
(74) *Attorney, Agent, or Firm* — Lowenstein Sandler LLP

(57) ABSTRACT

The disclosure relates to a conveying storage device for containers, said device comprising: a first conveyor/second conveyor which is drivable in a first direction/second direction; a transfer device for transferring containers from a first conveying surface to a second conveying surface; an additional element; and a separating element. Between the transfer device and the separating element is a passage region along a transition region between the first and second conveying surface. The transfer device is movable into an emptying position during an emptying process. The additional element is movable during the emptying process relative to the transfer device, is introducible into the passage region or is located in the passage region, and can move containers to the second conveyor.

20 Claims, 18 Drawing Sheets

(51) Int. Cl.
   *B65G 37/00* (2006.01)
   *B65G 47/68* (2006.01)
   *B65G 47/76* (2006.01)

(52) U.S. Cl.
   CPC .... *B65G 47/766* (2013.01); *B65G 2201/0244* (2013.01); *B65G 2201/0252* (2013.01); *B65G 2203/0233* (2013.01)

(58) Field of Classification Search
   USPC ...................................... 198/347.4, 594, 597
   See application file for complete search history.

(56) References Cited

U.S. PATENT DOCUMENTS

| | | | |
|---|---|---|---|
| 6,230,874 B1 * | 5/2001 | Steeber | B65G 15/60 198/457.06 |
| 6,260,688 B1 * | 7/2001 | Steeber | B65G 21/18 198/347.4 |
| 6,497,321 B2 * | 12/2002 | Horton | B65G 47/5131 198/594 |
| 6,523,669 B1 * | 2/2003 | Steeber | B65G 47/5131 198/370.01 |
| 6,612,420 B1 * | 9/2003 | Hartness, III | B65G 47/5131 198/594 |
| 7,028,830 B2 * | 4/2006 | Beesley | B65G 47/5131 198/594 |
| 8,573,380 B2 * | 11/2013 | Petrovic | B65G 47/5131 198/347.4 |
| 2002/0125107 A1 | 9/2002 | Horton et al. | |
| 2003/0183087 A1 | 10/2003 | Ahlberg | |
| 2012/0132503 A1 | 5/2012 | Petrovic | |

FOREIGN PATENT DOCUMENTS

| | | |
|---|---|---|
| EP | 1348345 A1 | 10/2003 |
| EP | 1326793 B2 | 4/2006 |
| JP | S59149225 A | 8/1984 |
| WO | 0232797 A1 | 4/2002 |
| WO | 2011019291 A1 | 2/2011 |

* cited by examiner

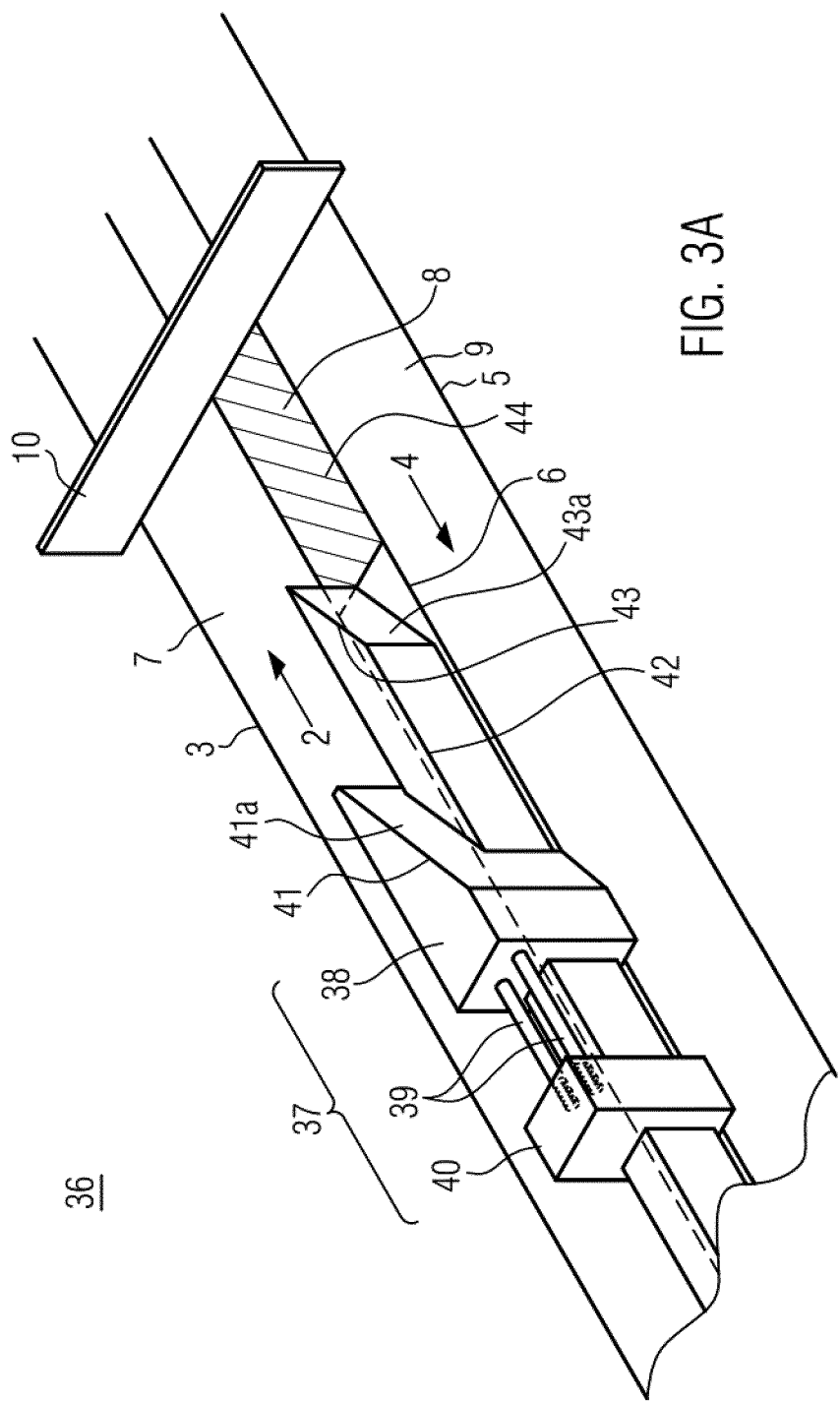

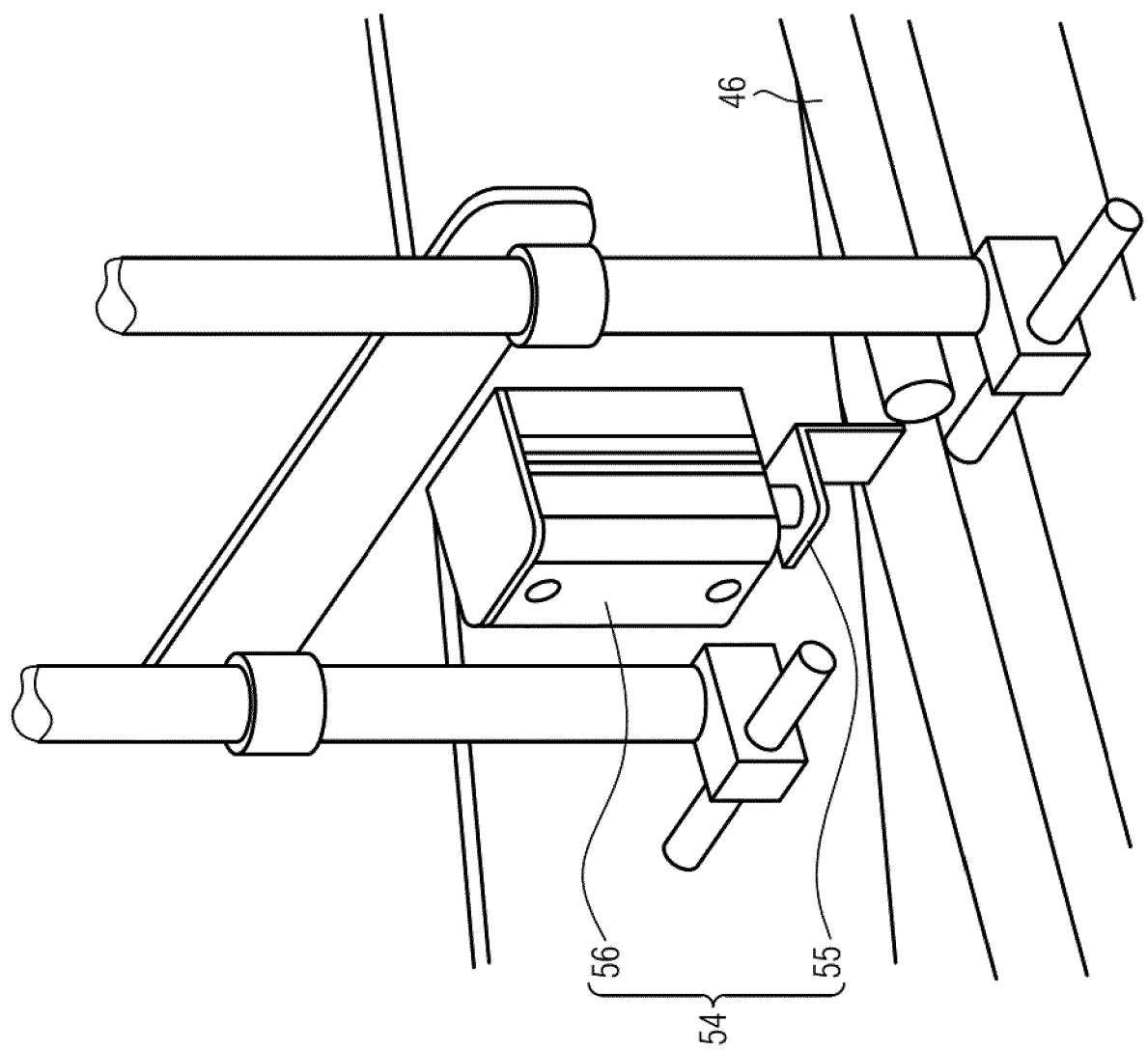

CONVEYING STORAGE DEVICE AND CORRESPONDING METHOD

RELATED APPLICATIONS

This application is a National State of International Application No. PCT/EP2018/069268 filed Jul. 16, 2018, which claims the benefit of German Patent Application No. 10 2017 212 125.4 filed Jul. 14, 2017, both of which are incorporated by reference herein.

FIELD OF THE INVENTION

The present disclosure relates to a conveying storage.

BACKGROUND

In container treatment lines, where containers generally pass through several treatment stations, the treatment stations can treat the containers at different rates per hour and faults in one or more of the treatment stations may result in a backlog of containers. In order to prevent the container treatment machine from stopping, one or more accumulation tables are provided in the container treatment machine which serve as a buffer, i.e. intermediate storage, for the containers. The accumulating containers are stored on the accumulation table/the accumulation tables until, for example, they are returned to the process/processes of the container treatment machine in a single row without gaps or alternatively in mass transport by means of a discharge conveyor.

When emptying an intermediate storage, it may happen that containers remain in the region between the feeding conveyor and the discharging conveyor. In order to prevent them from being introduced into the process during a new process sequence in the container treatment machine, it is necessary to remove these containers from the region so that they can be discharged from the intermediate storage by means of the discharge conveyor.

US 2012/0132503 A1 discloses a flat collection table for collecting goods in a conveyor system, comprising two flat parallel conveyor belts, input and output conveyor belts, arranged side by side and driven in opposite directions and between which an intermediate conveyor belt is arranged. The collection table comprises at its downstream end a diverting unit fixed to a frame of the table and at its upstream end a deflector located above a dividing unit of the intermediate conveyor belt. When the collection table is emptied, the containers on the intermediate conveyor belt are transferred from the intermediate conveyor belt to the output conveyor belt by the movement of the intermediate conveyor belt and the deflector in cooperation with the deflector.

EP 1326793 discloses a device for controlling the flow of goods comprising a goods pushing element that pushes goods on a first conveyor towards a second conveyor in a driving manner, wherein the goods pushing element extends at least beyond the first conveyor. The goods transfer element is rotatably connected to a transport element, allowing the goods transfer element to operate appropriately when moving along the conveyors. The device further comprises a second goods transfer element arranged at a distance from the first goods transfer element, wherein the second goods transfer element is disposed between the two conveyors and comprises a second goods pushing element which deflects the goods from the first to the second conveyor. The second goods pushing element may comprise a belt conveyor driven by a drive wheel.

When emptying the collection table/the device, it may happen that if the deflector/the first goods transfer element is moved towards the dividing device/the second goods transfer element, there is a risk of trapping the hands of operating personnel.

BRIEF DESCRIPTION OF THE DRAWINGS

FIG. 3A shows a third embodiment of the conveying storage device in a first operating state.

FIG. 4C shows a support for an additional element of the conveying storage device from FIGS. 4A and 4B.

DETAILED DESCRIPTION

Figure 1A:
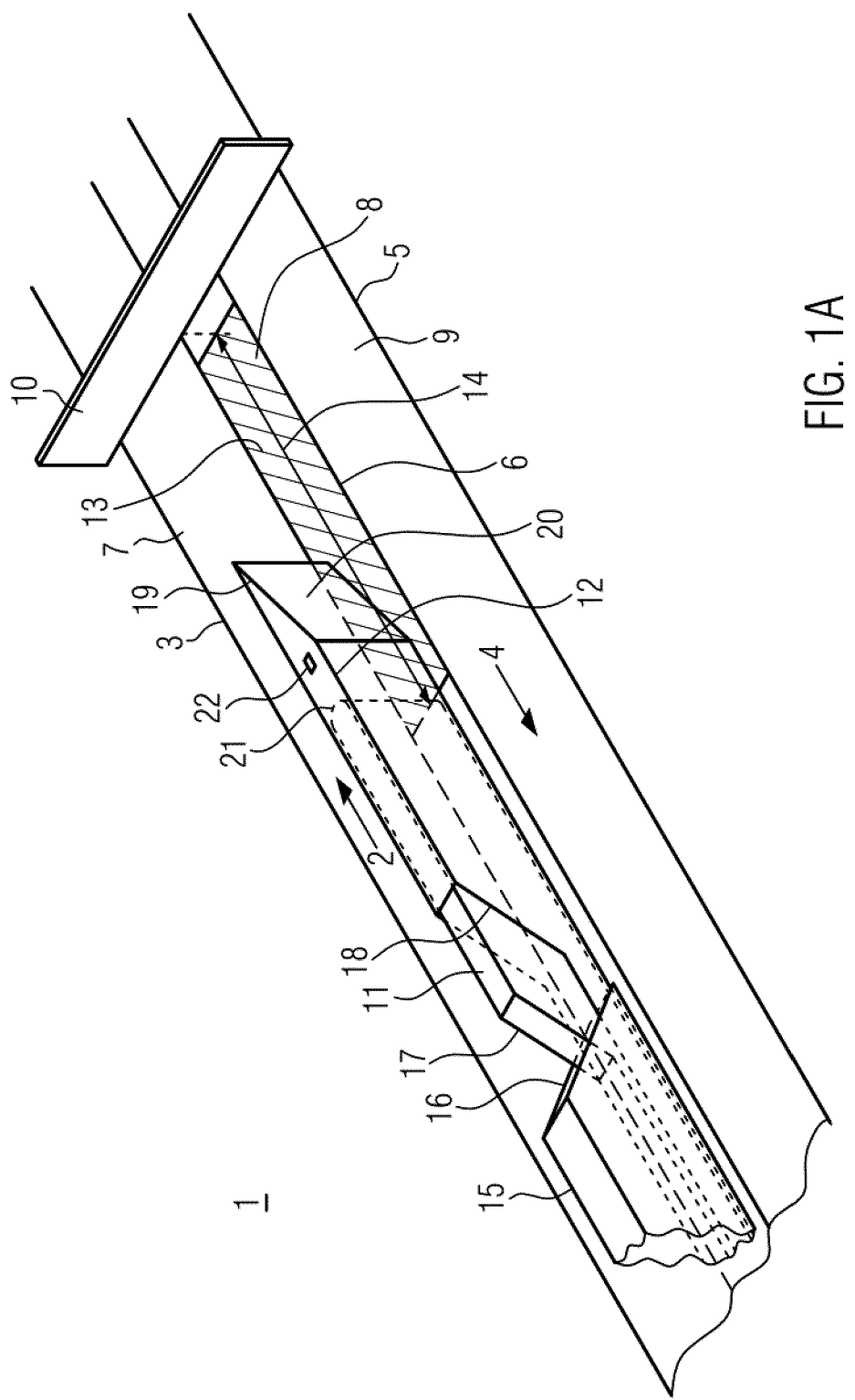
FIG. 1A shows a first embodiment of the conveying storage device in a first operating state.

Embodiments of the present disclosure are directed to a conveying storage device and a method of operating the conveying storage device which, when emptied, allows reliable and safe removal of all containers from the conveying storage device for operators, and which in addition is inherently safe (i.e. "intrinsically safe") to operate.

The conveying storage device for containers, such as bottles or cans according to embodiments of the disclosure comprises a first conveyor which is drivable in a first direction and a second conveyor which is drivable in a second direction, wherein the first direction and the second direction are opposite to each other, wherein the first conveyor and the second conveyor are arranged parallel to each other such that containers are transferable from a first conveying surface of the first conveyor to a second conveying surface of the second conveyor.

The conveying storage device further comprises a transfer device for transferring containers from the first conveying surface to the second conveying surface and an additional element.

Between the transfer device and the separating element, there is a passage region along a transition region between the first conveying surface and the second conveying surface. The transfer device is movable into an emptying position during an emptying process of the conveying storage device.

The additional element is provided in order to reliably remove containers from the passage region and safe for operating personnel and to enable inherently safe emptying.

The additional element may comprise a drive by means of which the additional element is movable, in particular linearly movable or rotatable or pivotable. If the additional element is arranged on the transfer device and is in particular movable with it, the drive for the additional element is preferably also arranged on the transfer element. If the transfer element comprises a driven belt for transferring the containers from the first conveying surface onto the second conveying surface, the drive of the belt can be coupled to the drive of the additional element, for example via a switchable coupling and/or cam disk.

Alternatively, the additional element and the belt can each have their own drive, wherein these drives are arranged in particular on the transfer element.

Alternatively, the drive for the additional element can be arranged on a stationary frame of the device and actuate the additional element arranged on the transfer element, for example via a fixed cam, as the transfer element passes by, in particular in a position in which there is a minimum distance between the separating element and the transfer element.

The additional element is configured such that during the emptying process, it is relatively movable in relation to the transfer device. The additional element is introducible into the passage region or arranged in the passage region during the emptying process and is adapted to transport containers to the second conveyor. Due to the additional element which is introducible into the passage region, there is generally no need for interaction by operating personnel to remove containers in the passage region. This enables an inherently safe emptying of the conveying storage device.

The conveying storage device may further comprise a third conveyor which is selectively drivable in the first direction or in the second direction or is stationary, which is arranged between the first conveyor and the second conveyor, wherein the first conveyor, the second conveyor, and the third conveyor are arranged parallel to each other such that containers can be transferred from the first conveying surface of the first conveyor to a third conveying surface of the third conveyor and from there to the second conveying surface of the second conveyor.

Thereby, the passage region along the third conveying surface exists between the transfer device and the separating element. The additional element is adapted to transport containers from the third conveyor to the second conveyor.

During an emptying process of the conveying storage device, the transfer device is movable to an emptying position. For this purpose, the transfer device can be mounted laterally next to the conveying storage device, i.e. once next to the first conveyor and once next to the second conveyor, and is movable by means of the bearing. If a third conveyor is present, the third conveyor can stand still in this case. In an emptying process, the bearing can be moved in the second direction. Alternatively, the transfer device may be arranged on the third conveyor and moved in the second direction by means of the third conveyor during an emptying process.

The additional element may be included in a separating element, wherein preferably the additional element is configured to be movable in relation to the separating element during an emptying process.

The additional element may comprise an elastic support and be lockable by means of the support, wherein preferably the additional element or part thereof is at least partly made of a resilient material or being resiliently mounted, wherein preferably the additional element or part thereof is at least partly moved in a direction of the force exerted by the containers or the transfer device on the additional element or part thereof upon contact with containers or upon contact with the transfer device.

Since the additional element moves to yield to the pressure of the containers, a potential force is correspondingly small and an operator will not suffer injury if he inserts a body part between the transfer device and the additional element.

The locking of the additional element by means of an elastic holder ensures safety of the operating personnel in the event of interaction by the operating personnel, since, for example, the elastic holder cannot trap the hand between the additional element and the transfer device.

The transfer device can be mounted laterally next to the conveying storage device and can be moved by means of the bearing.

Alternatively, the transfer device and the separating element may be arranged on the third conveyor and movable by the third conveyor in the first direction or in the second direction, respectively, with a passage region with constant spacing along the third conveying surface between the transfer device and the separating element.

An end portion of the separating element located in the second direction may have a chamfer, wherein preferably the separating element is guided by means of a guide element and preferably the guide element comprises a chamfer at an end portion located in the first direction. The safety of the operating personnel can be further increased by chamfering the end portion of the separating element, since when the separating element moves in the second direction, a hand is not trapped, as is the case with a straight end portion, but is pushed upwards, for example.

The additional element may comprise a shell which at least partially surrounds the separating element and which is movably mounted on the separating element, wherein the shell may be configured dimensionally stable. The shell may be open in one end portion in the first direction and in the other end portion in the second direction so that it can be moved on the separating element and the separating element can be moved through these two open regions of the shell. Due to the dimensional stability of the shell, containers located in the passage region can be moved to the second conveying surface during emptying.

Preferably, the end portion of the shell located in the first direction has an end face which extends perpendicularly to the third conveying surface and forms an angle with the first direction, wherein preferably the shell is guidable by means of the guide element. An end face formed in this way can advantageously transfer containers located in the passage region to the second conveying surface during emptying.

The shell may comprise an actuator with a magnet and an angled element which may be located on the shell. The actuator is preferably configured to be lockable by a pneumatic cylinder/linear motor and an additional angled element so that, when the actuator is locked, the shell on the separating element is extendable along the third conveying surface. For example, the pneumatic cylinder and the additional angled element can be arranged below the shell so that, if the pneumatic cylinder/linear motor and the angled element move, the danger that operating personnel could be injured during the movement is considerably reduced.

In another embodiment, the additional element may be configured in the form of a lever which, when the transfer device and the separating element have been moved to the emptying position, may be introducible into the passage region and which may be adapted to clear containers laterally from the third conveying surface in the passage region. Preferably, the lever is configured to be controllable by means of a pneumatic cylinder/linear motor. The lever may be located above this device during a storage and conveying process of the storage conveying device so that it does not affect the operation of this device.

In a further embodiment, the additional element may comprise a first block, a second block, and at least a spring, wherein the first block may be connected to the second block by means of the at least one spring, and wherein the separating element may pass through the first block and through the second block. Preferably, the first block is arranged in the first direction before the second block. During a storage and conveying process of the conveying storage device, the separating element, seen in the first direction, projects above the additional element. During emptying, the additional element is moved with respect to the separating element in the first direction so that containers arranged in the passage region can be moved from the third conveying surface to the second conveying surface by means of the first block.

The at least one spring may comprise a cover, wherein preferably an end portion of the first block located in the first direction has an end face perpendicular to the third conveying surface and forming an angle with the first direction. The cover can prevent operating personnel from reaching into the region of the at least one spring and thereby possibly being injured. The end face of the first block can increase the safety of the operating personnel, because together with the spring-loaded bearing of the first block, it can prevent a hand from being trapped.

In another embodiment, the additional element can be designed as a rod. The separating element can then also include a through-hole in which the rod can be arranged movably. During a storage and conveying process of the conveying storage device, the rod is preferably arranged in the separating element in such a way that it does not project beyond the end portion of the separating element located in the first direction. For emptying the conveying storage device, the rod can be moved in the first direction so that containers present in the passage region are transferred from the third conveying surface to the second conveying surface.

The rod can be spring-mounted with a pneumatic cylinder/linear motor and an angled element and configured to be lockable for moving the rod. If, during the emptying of the conveying storage device, operating personnel should reach between the separating element or the rod and the transfer device in the passage region, a hand cannot be trapped by the spring-loaded bearing of the rod.

In another embodiment, the additional element may be designed as a driven element, wherein preferably the additional element may be arranged on the transfer device or on a structure independent of the transfer device.

Alternatively, the separating element may be configured as a railing, wherein the additional element may be configured as a driven element. The additional element may be arranged on the railing, on the transfer device or on a structure independent of both the railing and the transfer device. Containers may be guided from the first conveying surface to the second conveying surface by means of the railing. In order to prevent the operating personnel from getting their hands trapped between the separating element and the transfer device during emptying, the additional element may be provided in the passage region.

The driven element can comprise its own drive, for example a conventional drive motor.

Alternatively, the driven element can be coupled to a drive of the third conveyor, preferably with a coupling which can be activated in the emptying process. For example, a conventional drive motor can be used to drive the third conveyor.

The driven element may comprise a brush, wherein the brush preferably is rotatable and the brush preferably comprises elastic bristles. A direction of rotation of the brush can be controlled in such a way that the rotation of the brush causes containers to be moved from the first and third conveying surfaces to the second conveying surface during emptying.

If the conveying storage device does not comprise a third conveyor, the additional element may be configured as a transfer element, wherein preferably the transfer element has a curved surface, or wherein the transfer element comprises at least two units assembled at an angle of 120° to 180°.

The transfer element can transfer containers from the first conveyor to the second conveyor. If, during the emptying process, a last bottle is placed on the first conveyor in the passage region, the transfer element can be activated, pivoted to the side, thereby contacting the container and pushing it onto the second conveyor. The transfer element can then pivot back to its initial position.

For example, the transition element can be configured finger-like. It may have a curvature that is located in the direction of the pivoting movement when the transfer element is activated. It can also be provided that the transfer element is configured flatly. In the flat design, the transfer element can comprise at least two units assembled at an angle of 120° to 180°.

This conveying storage device may further comprise a drive for the transfer element, wherein preferably a connecting shaft is provided which connects the drive and the transfer element, wherein preferably a sensor is provided for detection of presence of one or more containers in the passage region, wherein the sensor is preferably adapted to trigger a triggering mechanism of the transfer element when one or more containers are detected.

If a container remains on the first conveyor during the emptying process, this can be detected by the sensor and subsequently the transfer element can be pivoted to move the container from the first conveyor to the second conveyor.

The transfer element may be arranged on the transfer device, wherein preferably the drive, the connecting shaft, and the sensor are arranged on the transfer device.

Embodiments of the disclosure further relate to methods for operating a conveying storage device as described above or further below during an emptying process.

A first method may include the following steps:
driving the first conveyor in the first direction,
driving the second conveyor in the second direction,
moving the transfer device to the emptying position by moving it in the second direction, and
during the emptying process, detecting containers remaining on the first conveyor and activating the additional element to transfer the remaining containers from the first conveyor onto the second conveyor.

An alternative method may include the following steps:
driving the first conveyor in the first direction,
driving the second conveyor in the second direction,
driving the third conveyor in the second direction or not driving the third conveyor,
moving the transfer device to the emptying position by moving it in the second direction, and
during the emptying process, transporting containers standing on the third conveyor in the second direction until they come into contact with the additional element and by means of the additional element are automatically transferred from the third conveyor to the second conveyor.

The basic components of the conveying storage devices described in FIGS. 1A to 7 have the same structure and are therefore described here in summary. The conveying storage devices 1, 26, 36, 45, 57, 72, 73 described in FIGS. 1A to 7 for containers 63 each comprise a first conveyor 3, 59 which is drivable in a first direction 2, 58 and a second conveyor 5, 61 which is drivable in a second direction 4, 60, wherein the first direction 2, 58 and the second direction 4, 60 are opposite to each other.

In addition, the first to seventh embodiments of the conveying storage devices 1, 26, 36, 45, 57, 72, 73 each comprise a third conveyor 6, 62 which is driveable selectively in the first direction 2, 58 or in the second direction 4, 60, wherein the first conveyor 3, 59, the second conveyor 5, 61, and the third conveyor 6, 62 are arranged parallel to each other such that containers 63 can be transferred from a first conveying surface 7, 64 of the first conveyor 3, 59 to a third conveying surface 8, 65 of the third conveyor 6, 62, from there to a second conveying surface 9, 66 of the second conveyor 5, 61.

In addition, said conveying storage devices 1, 26, 36, 45, 57, 72, 73 each comprise a transfer device 10, 67 for transferring containers 63 from the first conveying surface 7, 64 to the third conveying surface 8, 65 and from there to the second conveying surface 9, 66, and a separating element 11, 29, 42, 47, 68 with an additional element 12, 27, 37, 46, 69.

The transfer device 10, 67 and the separating element 11, 29, 42, 47, 68 are arranged on the third conveyor 6, 62 and is movable by this in the first direction 2, 58 or in the second direction 4, 60, respectively, wherein along the third conveying surface 8, 65 between the transfer device 10, 67 and the separating element 11, 29, 42, 47, 68, there is a passage region 13, 30, 44, 53 with constant spacing 14, 35, wherein the transfer device 10, 67 and the separating element 11, 29, 42, 47, 68 are movable into an emptying position during an emptying process of the conveying storage device 1, 26, 36, 45, 57, 72, 73.

The separating element 11, 29, 42, 47, 68 and the additional element 12, 27, 37, 46, 69 as well as an elastic support of the additional element 12, 27, 37, 46, 69 can be configured in different ways in the various embodiments of the conveying storage device 1, 26, 36, 45, 57, 72, 73.

FIG. 1A shows a first embodiment of the conveying storage device 1 in a first operating state. The additional element 12 comprises a shell 12 which at least partially surrounds the separating element 11 and which is movably mounted on the separating element 11, wherein the shell 12 is configured to be dimensionally stable. The shell 12 comprises an actuator 22 with a magnet and an angled element arranged on the shell 12. The actuator 22 is configured to be lockable by a pneumatic valve/linear motor and a further angle (see FIG. 1C) so that, when the actuator 22 is locked, the shell 12 on the separating element 11 is extendable along the third conveying surface 8.

The shell 12 and the separating element 11 are guided by means of a guide element 15, which includes a chamfer at its end portion 16 in the first direction 2. The end portion 17 of the separating element 11 located in the second direction 4, and the end portion 18 of the shell 12, located in the second direction 4, also each have a chamfer.

The end portion 19 of the shell 12 located in the first direction 2 has an end face 20 which is perpendicular to the third conveying surface 8 and forms an angle with the second direction 4 so that containers can be moved, generally pushed, from the third conveying surface 8 to the second conveying surface 9 by the chamfer formed thereby.

The end portion 21 of the separating element 11 located in the first direction 2 is rounded in FIG. 1A. However, it may also be provided that this end portion is formed analogously to the end portion 19 of the shell 12 located in the first direction 2.

In FIG. 1A, there is a spatial distance between the end portion 19 of the shell 12, which is located in the first direction 2, and the transfer device 10 so that containers could still be present in this region during emptying of the conveying storage device 1.

Figure 1B:
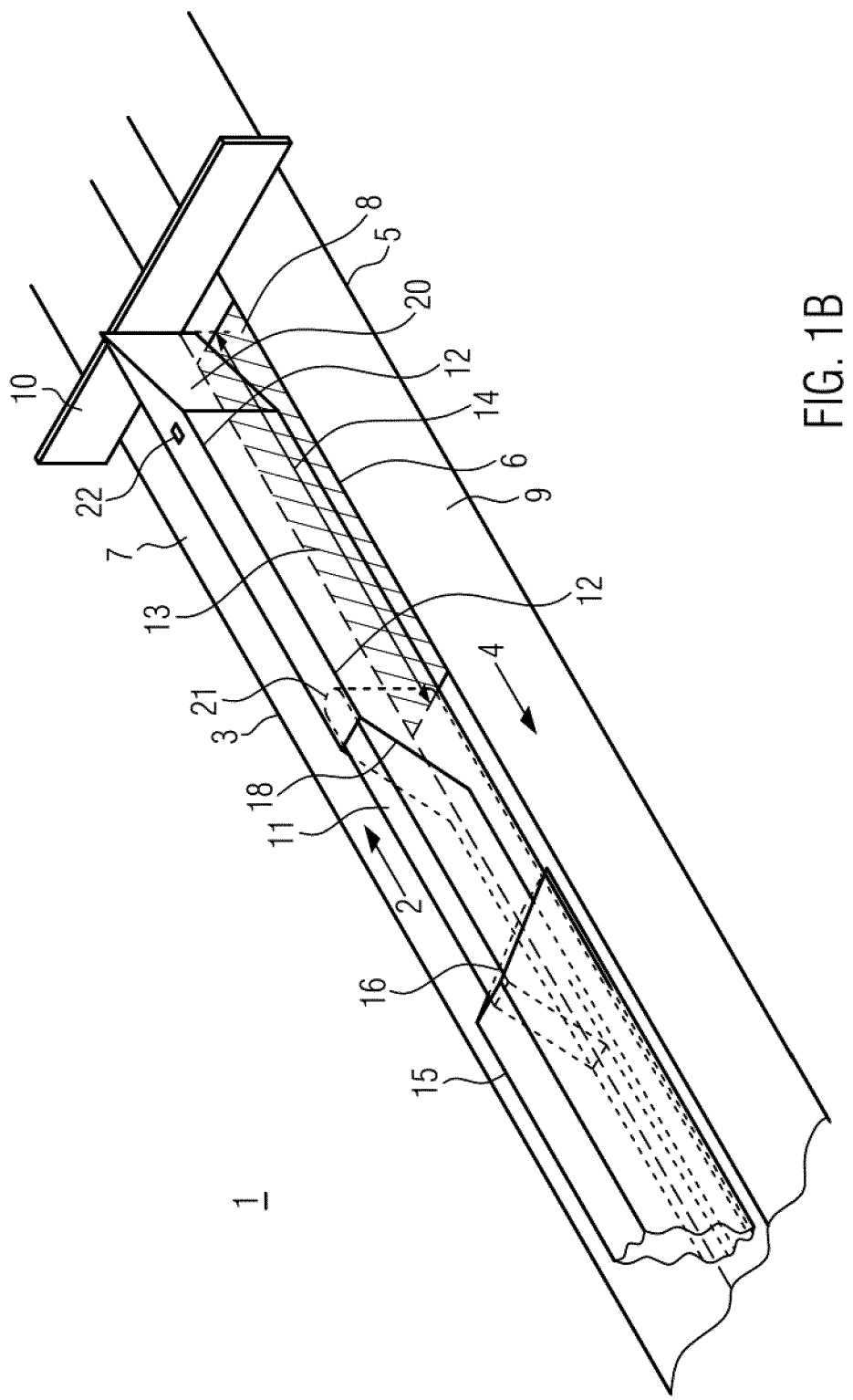
FIG. 1B shows the conveying storage device of FIG. 1A in a second operating state.

In order to transfer such containers by means of the shell 12, in particular by means of the end face 20, wholly or partly from the third conveying surface 8 onto the second conveying surface 9 so that said containers can be transported by means of the second conveyor 5 in the second direction 4, as shown in FIG. 1B, the spatial distance between the end portion 19 of the shell 12 located in the first direction 2 and the transfer device 10 is reduced.

Figure 1C:
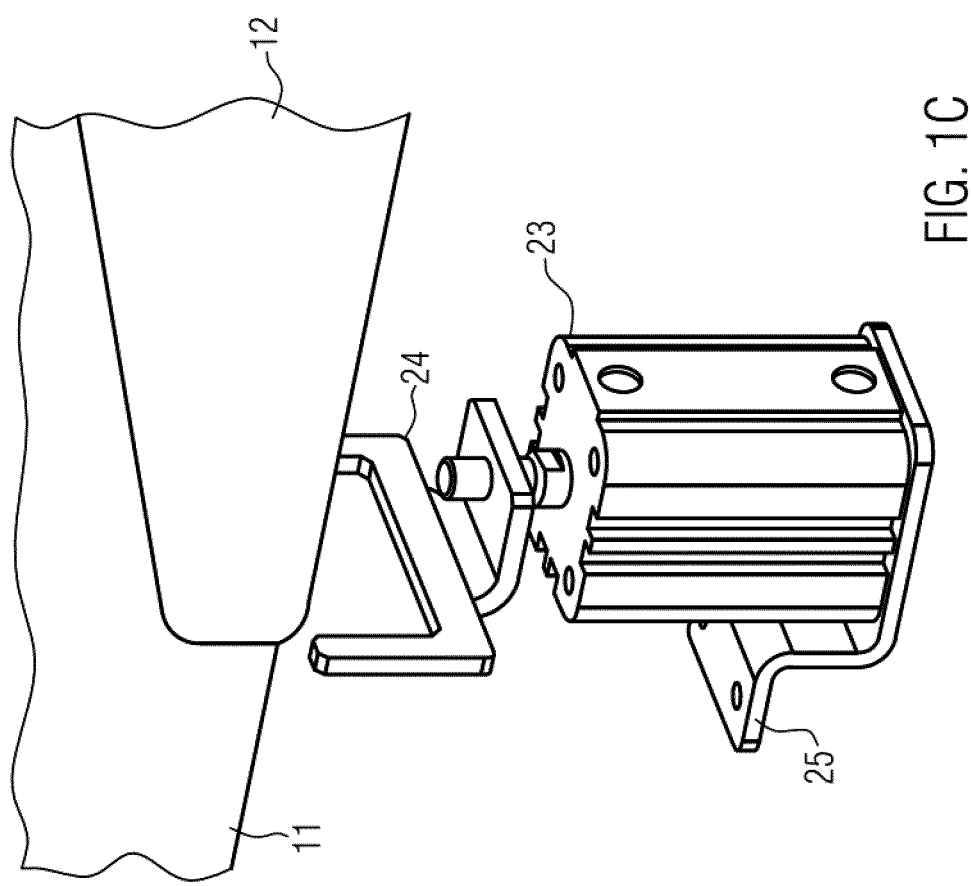
FIG. 1C shows a support of an additional element of the conveying storage device from FIGS. 1A and 1B.

FIG. 1C exemplarily shows a pneumatic cylinder 23 and an angled element 24, which are arranged on a supporting structure 25. The angled element 24 is movable up and down by means of the pneumatic cylinder 23.

Figure 2A:
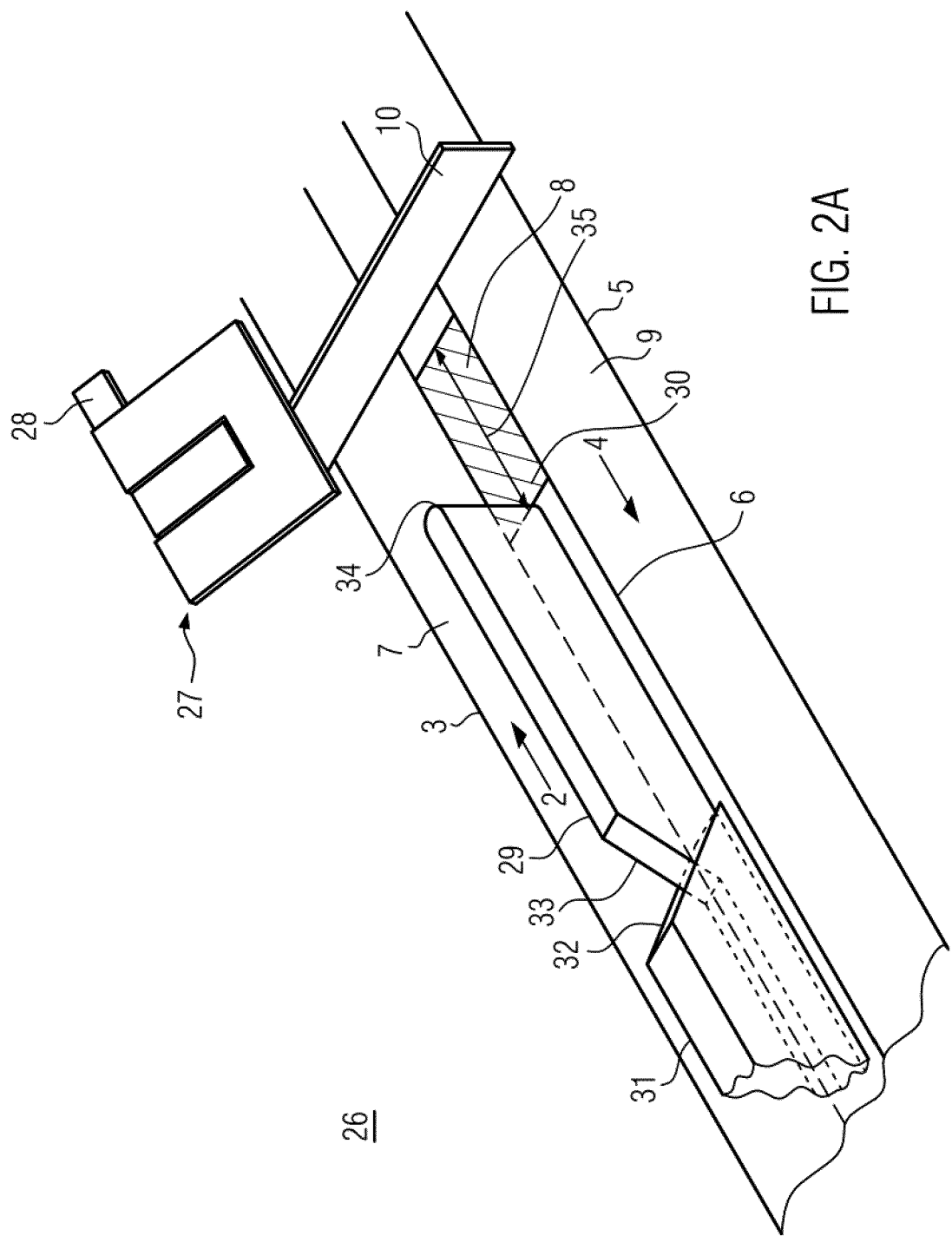
FIG. 2A shows a second embodiment of the conveying storage device in a first operating state.

FIG. 2A shows a second embodiment of the conveying storage device 26 in a first operating state. The additional element 27 is configured as a lever 28 which, when the transfer device 10 and the separating element 29 have been moved into the emptying position, can be moved into the passage region 30 at a constant distance 35. The lever 28 can be controlled by means of a pneumatic cylinder. During a storage and conveying process of the conveying storage device 26 the lever 28 is arranged as shown in FIG. 2A above said device 26 so that it does not affect the operation of said device 26.

The separating element 29 is guided by means of a guide element 31 which includes a chamfer at its end portion 32 in the first direction 2. The end portion 33 of the separating element 29 located in the second direction 4 also has a chamfer. The end portion 34 of the separating element 29 located in the first direction 2 has a rounding.

Figure 2B:
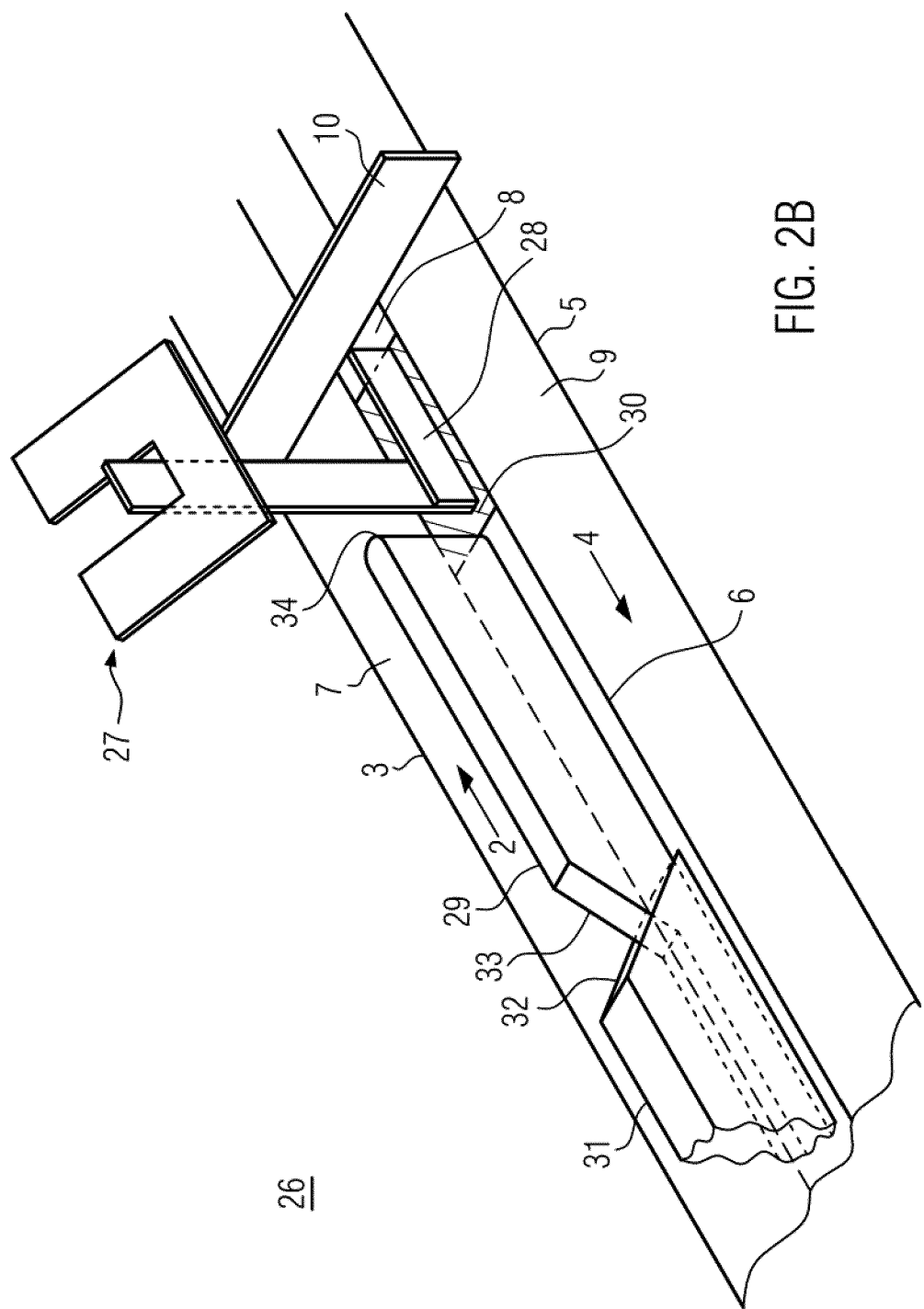
FIG. 2B shows the conveying storage device of FIG. 2A in a second operating state.

FIG. 2B shows the conveying storage device 26 in a second operating state in which the lever 28 was introduced into the passage region 30 between the separating element 29 and the transfer device 10. This allows containers in passage region 30 to be moved laterally from the third conveying surface 8 onto the second conveying surface 9.

FIG. 3A shows a third embodiment of the conveying storage device 36 in a first operating state. The additional element 37 comprises a first block 38, a second block 40, and two springs 39, wherein the first block 38 is adapted to remove containers from a passage region 44. The first block 38 is spring-loaded to the second block 40 by the two springs 39 and an end portion 41 of the first block 38 located in the first direction 2 has an end face 41a which is perpendicular to the third conveying surface 8 and forms an angle with the first direction 2. The first 38 and the second block 40 have passages through which the separating element 42 can be moved. The end portion 43 of the separating element 42 located in the first direction 2 has an end face 42a which is perpendicular to the third conveying surface 8 and forms an angle with the first direction 2.

During an emptying process of the conveying storage device 36, as shown, the separating element 42, viewed in the first direction 2, projects above the additional element 37 so that by means of the first block 38 containers can be moved in the passage region 44 from the third conveying surface 8 to the second conveying surface 9.

Figure 3B:
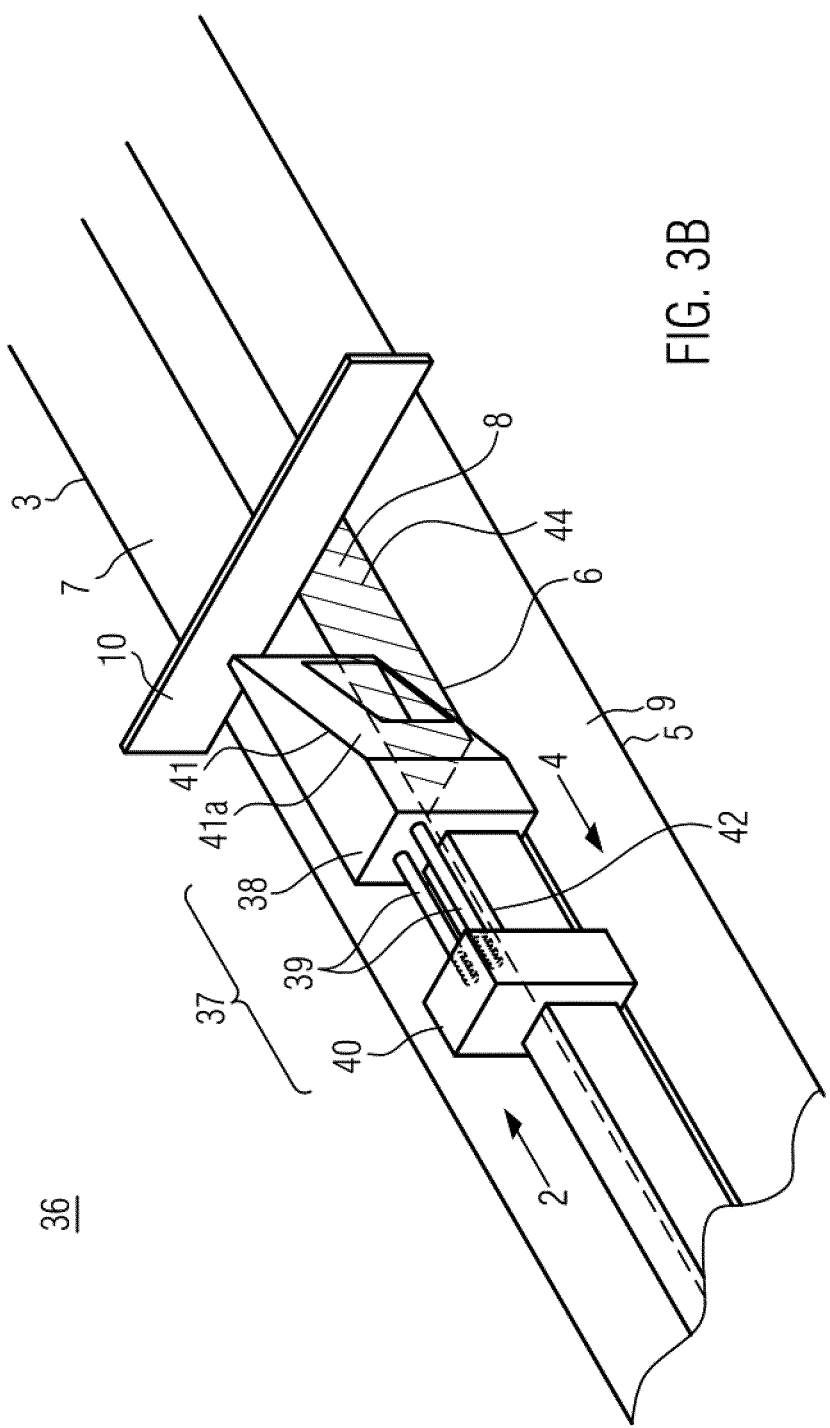
FIG. 3B shows the conveying storage device of FIG. 3A in a second operating state.

FIG. 3B shows that in a storage and conveying process of the conveying storage device 36, the separating element 42 was moved in the second direction 4 with respect to the additional element 37.

Figure 4A:
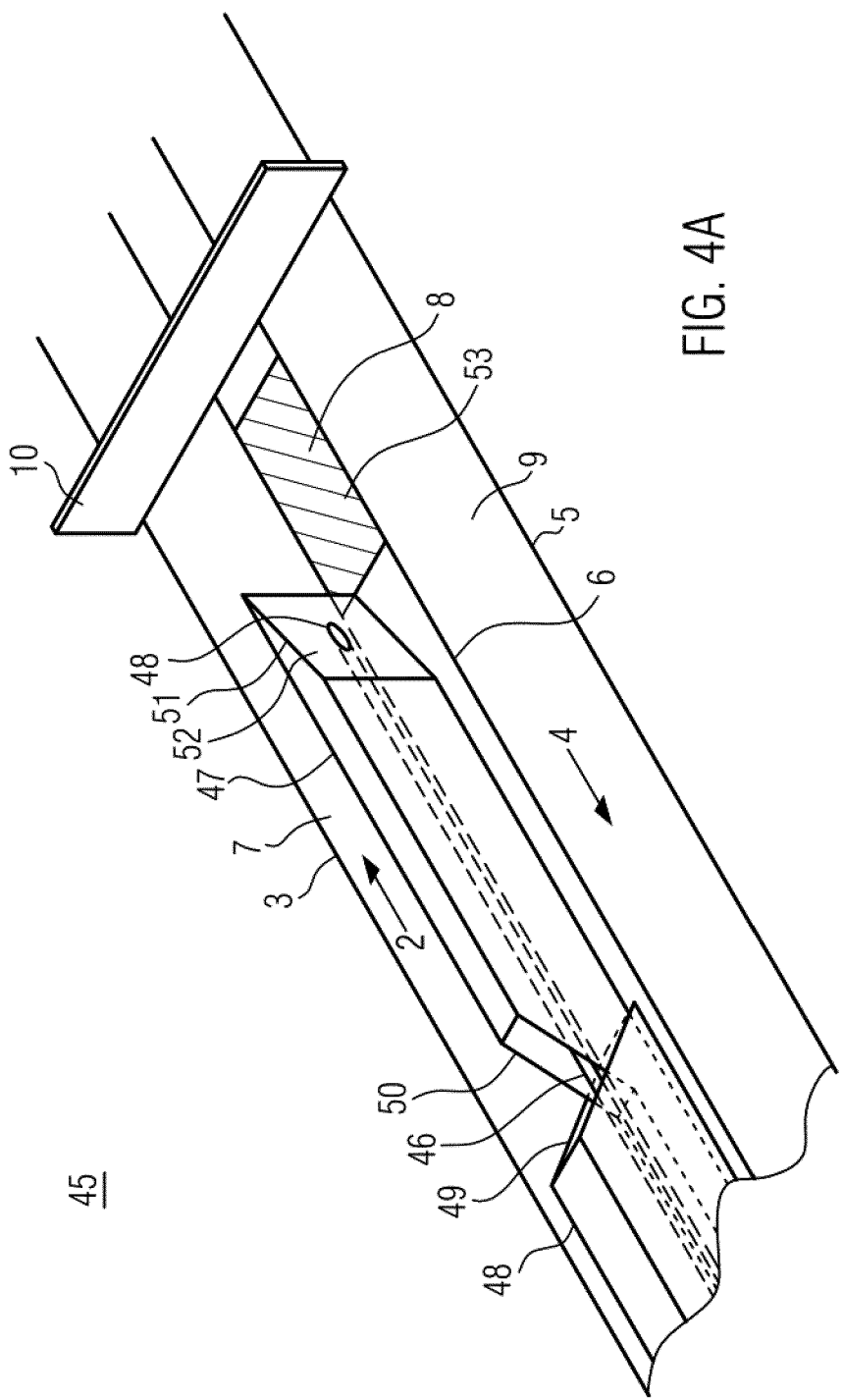
FIG. 4A shows a fourth embodiment of a conveying storage device in a first operating state.

FIG. 4A shows a fourth embodiment of a conveying storage device 45 in a first operating state. The additional element is configured as a rod 46. The separating element 47 comprises a through-hole 48 in which the rod 46 is movably arranged in order to be able to be moved in the first direction 2 for removing containers in the passage region 53. The separating element 47 is guided by a guide element 48 which includes a chamfer at its end portion 49 in the first direction 2. The end portion 50 of the separating element 47 located in the second direction 4 also has a chamfer. The end portion 51 of the separating element 47 located in the first direction 2 has an end face 52 which is perpendicular to the third conveying surface 8 and forms an angle with the second direction 4 so that containers can be moved from the third conveying surface 8 to the second conveying surface 9 by means of the chamfer formed thereby.

During a storage and conveying process of the conveying storage device 45, the rod 46 is arranged in the separating element 47 such that it does not project beyond the end portion 51 of the separating element 47 located in the first direction 2.

Figure 4B:
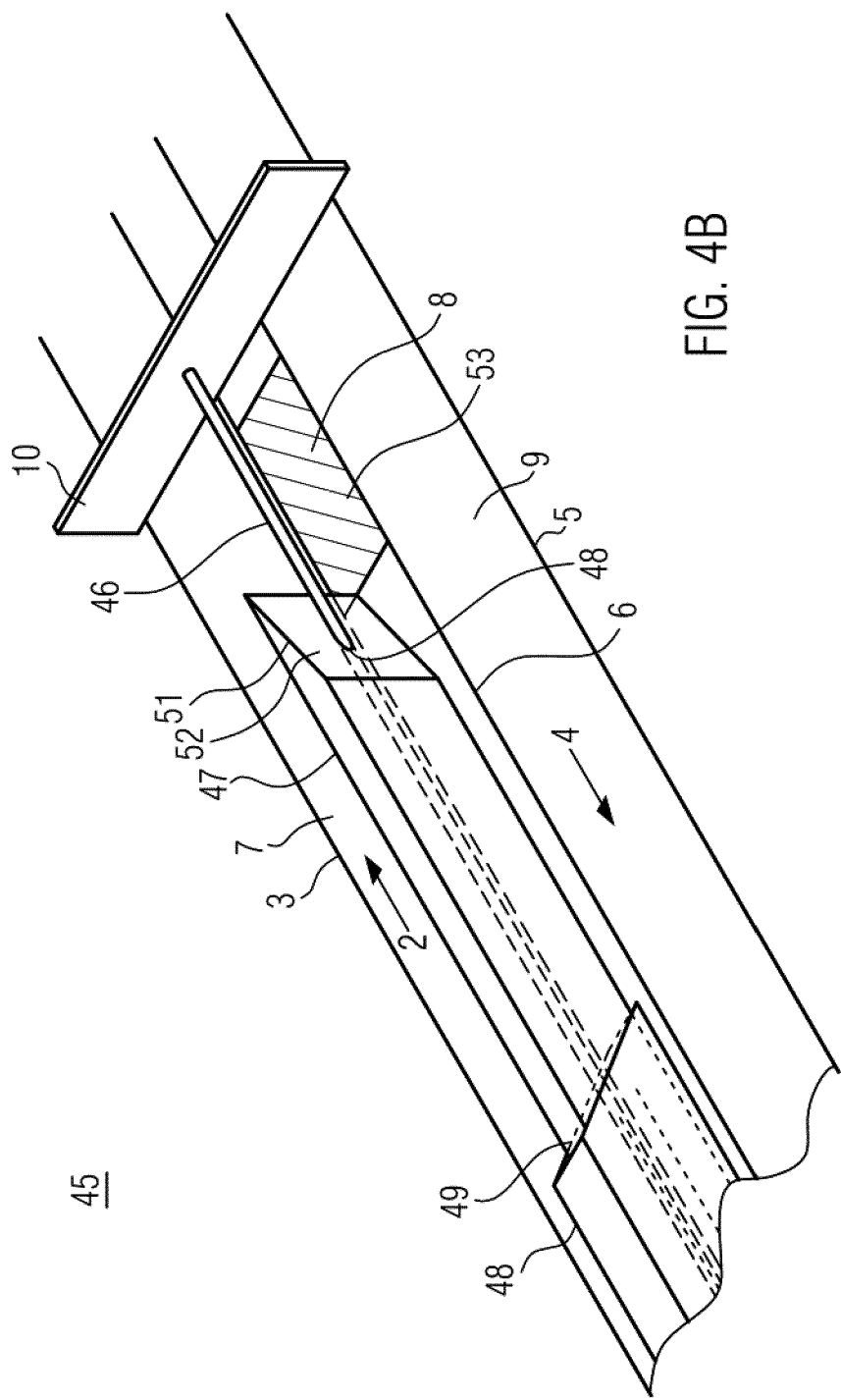
FIG. 4B shows the conveying storage device of FIG. 4A in a second operating state.

FIG. 4B shows how, in an emptying process, the locked rod 46 projects beyond the end face 52 by a movement of the separating element 47 in the second direction 4 and how containers present in the passage region 53 can be transferred from the third conveying surface 8 onto the second conveying surface 9 by a movement of the transfer device 10 by means of the rod 46.

FIG. 4C shows a support 54 for the rod 46, i.e. the additional element which comprises a pneumatic cylinder 56 and an angled element 55. The rod 46 is spring-loaded by means of the support 54 and can be locked for moving the rod 46. During an emptying process, the locking can be done by positive locking. The support 54 can, for example, be fixed by means of a spring plate to ensure suspension. For example, the spring plate can be located above the pneumatic cylinder 56.

Figure 5:
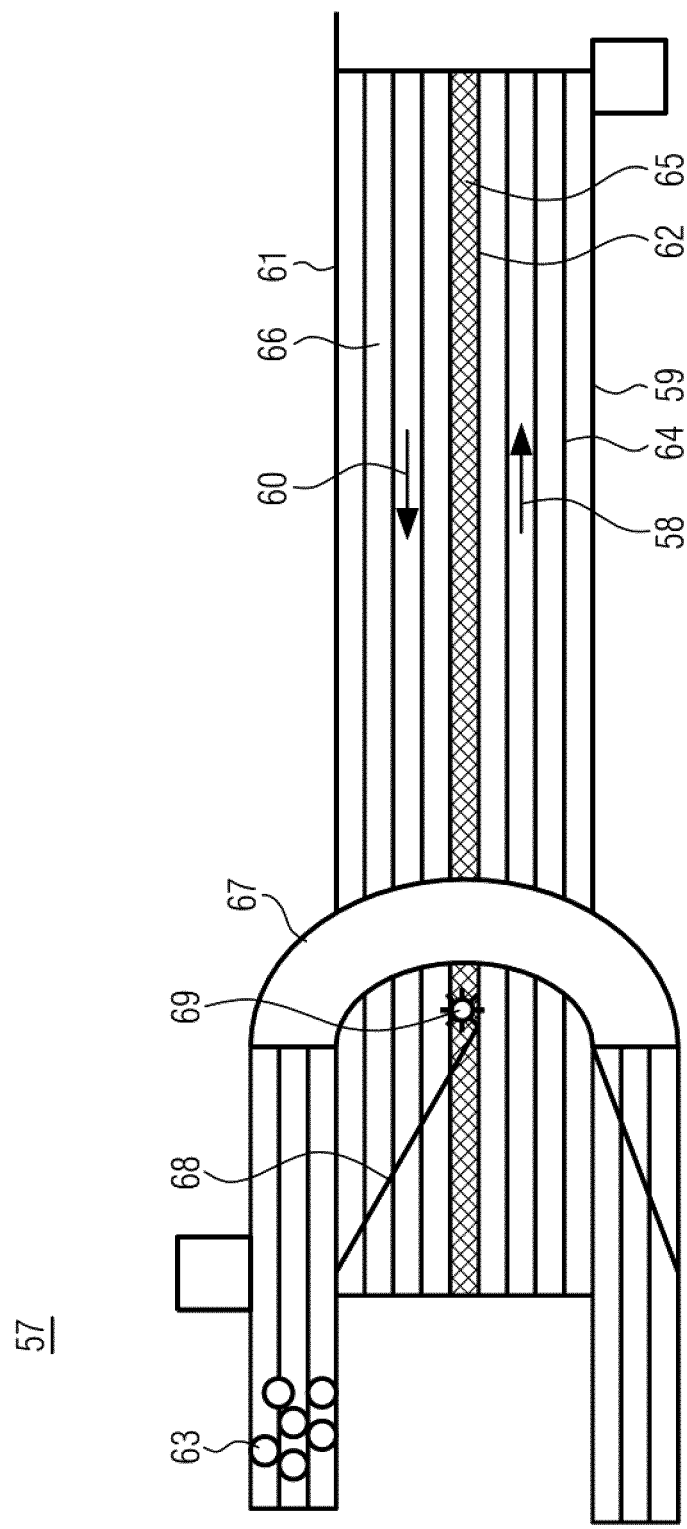
FIG. 5 shows a fifth embodiment of the conveying storage device.

FIG. 5 shows a fifth embodiment of the conveying storage device 57. The conveying storage device 57 comprises a first conveyor 59 which is drivable in a first direction 58 and a second conveyor 61 which is drivable in a second direction 60, wherein the first direction 58 and the second direction 60 are opposite to each other, and a third conveyor 62 which is drivable selectively in the first 58 or in the second direction 60 or is stationary which is arranged between the first 59 and the second conveyor 61, wherein the first 59, the second 61, and the third conveyor 62 are arranged parallel to each other such that containers 63 can be transferred from a first conveying surface 64 of the first conveyor 59 to a third conveying surface 65 of the third conveyor 62, and from there to a second conveying surface 66 of the second conveyor 61. The conveyor 62 may in this case also be a simple plate fixed (without being connected to a drive) to a frame of the conveying storage device 57.

In addition, the conveying storage device 57 comprises a transfer device 67 for transferring containers 63 from the first 64 to the third 65 and from there to the second conveying surface 66 and a separating element 68 with an additional element 69. The containers are transferred here in an operating mode from the transfer device 67. The separating element 68 is configured as a railing 68 and the additional element 69 as a rotating brush 69. In this case, the separating element 68 can also be dispensed with if, for example, there is little or no back pressure on the containers 63 upstream of the conveying storage device 57 or at the beginning of the first conveyor 59.

At least the bristles of the brush 69 here are at least partially made of an elastic material and are bent over by the containers 68 which are moved in an emptying mode on the third conveyor 62 onto the brush 69 by the third conveyor 62 and/or pushed or transported by means of the transfer device 67. After a container 63 has passed the brush, the bristles elastically bend back again.

The brush 69 can be fixed or rotating. Rotation can be effected either by a drive connected to the brush or by a gearing which interacts with another drive of the conveying storage device 57, for example with the drive of the transfer device 67.

Containers can be guided by means of the railing from the second conveying surface 66 to another conveyor at the outlet of the conveying storage device 57 (at the top where the containers 63 are shown). In order to prevent containers remaining when the conveying storage device 57 is emptied and operating personnel's hands from being trapped between railing 68 and transfer device 67 or to transport the containers 63 safely onto the second conveyor 61, the rotating brush 69 is provided in the passage region. The length of the bristles of the brush 69 is preferably adapted to the containers to be processed. In particular, the maximum length corresponds to the diameter of the containers to be processed.

The total diameter or extension of the brush 69 perpendicular to the transport direction is preferably greater than one third of the width of the conveyor 62 and smaller than three times the width of the conveyor 62.

The brush 69 does not necessarily have to exhibit a cylindrical shape, but can also be wedge-shaped, with a lateral surface of the wedge pushing the containers 63 in the direction of the second conveyor 61 (comparable to the surface 52 in the previous figures).

In the embodiment shown in FIG. 5, the rotating brush 69 is arranged on the railing 68.

Figure 6:
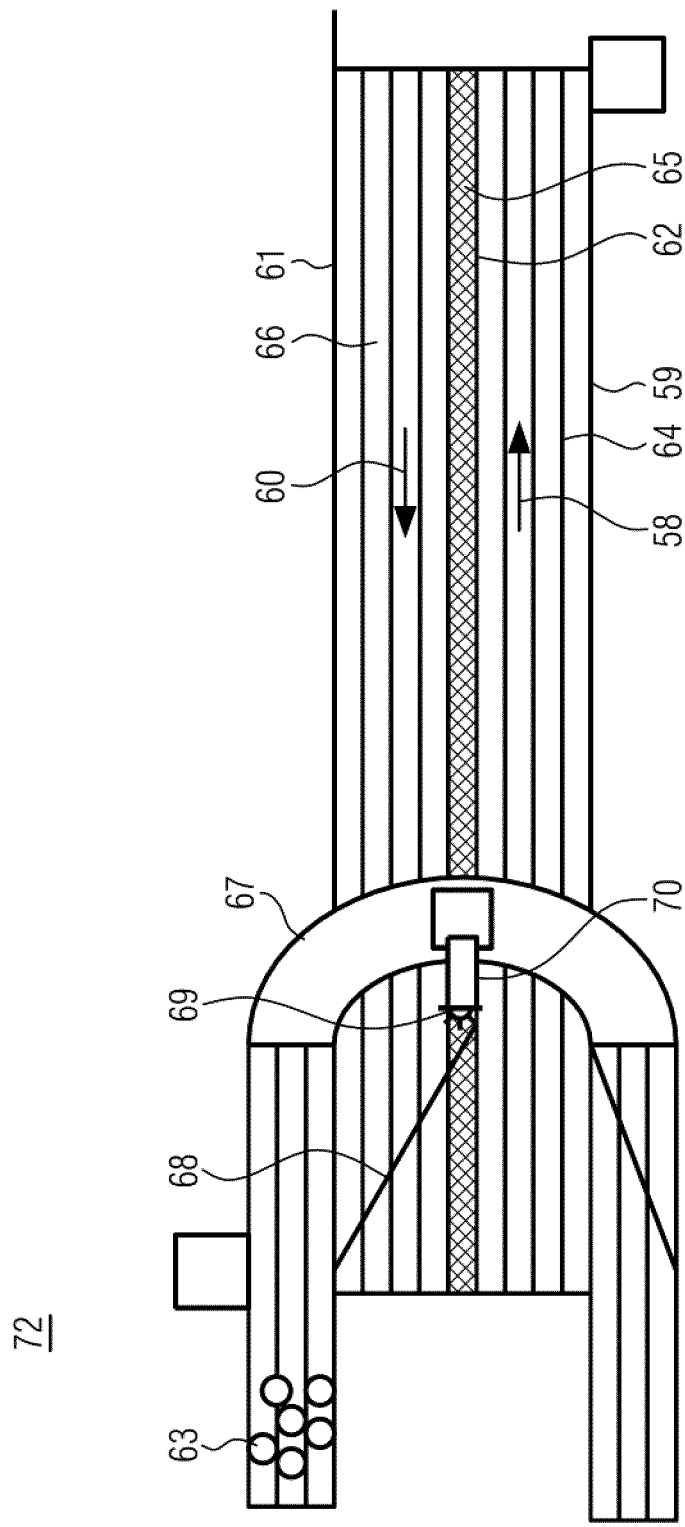
FIG. 6 shows a sixth embodiment of the conveying storage device.

In the embodiment of the conveying storage device 72 shown in FIG. 6, the brush 69, preferably rotating, is connected to the transfer device 67 by means of a support 70.

Figure 7:
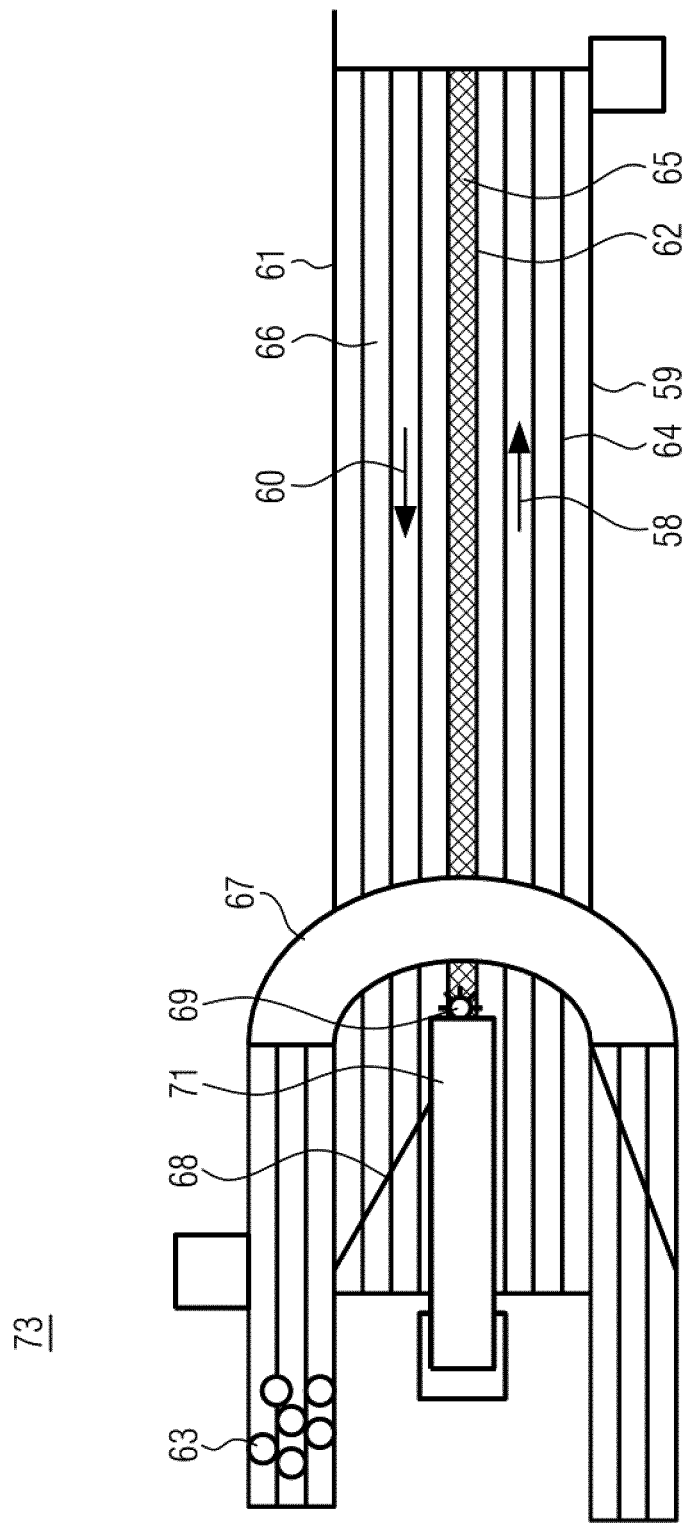
FIG. 7 shows a seventh embodiment of the conveying storage device.

In the embodiment of the conveying storage device 73 shown in FIG. 7, the rotating brush 69 is arranged on a support 71 independent of the railing 68 and the transfer device 67. The support can be placed on a hall floor or connected to a frame of the conveying storage device 57.

Figure 8A:
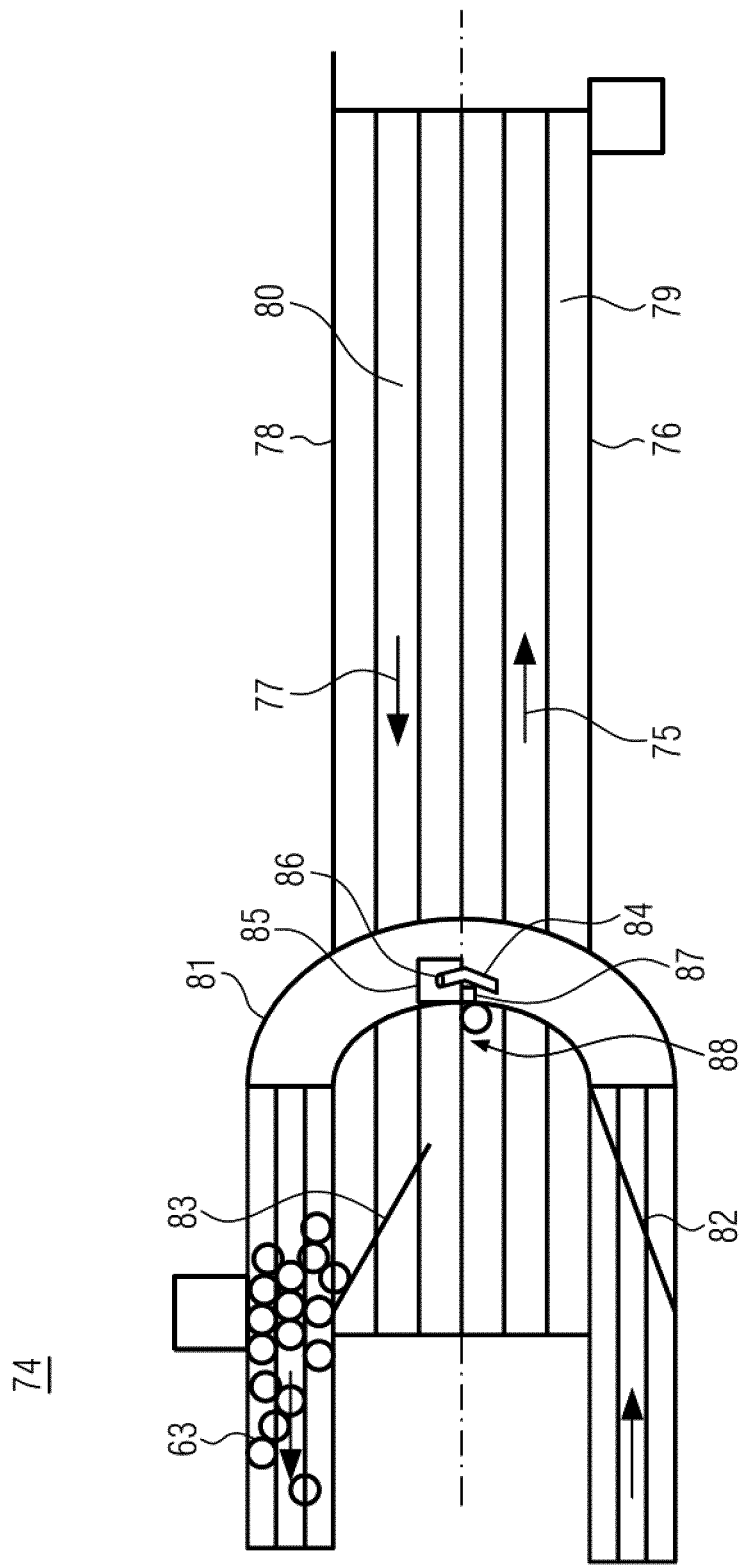
FIG. 8A shows an eighth embodiment of the conveying storage device in a first operating state.

FIG. 8A shows an eighth embodiment of the conveying storage device 74 in a first operating state. In contrast to the embodiments one to seven, said conveying storage device 74 does not include a third conveyor. The conveying storage device 74 comprises a first conveyor 76 which is drivable in a first direction 75 and a second conveyor 78 which is drivable in a second direction 77, wherein the first direction 75 and the second direction 77 are opposite to each other, wherein the first 76 and the second conveyor 78 are arranged parallel to each other so that containers 63 can be transferred from a first conveying surface 79 of the first conveyor 76 to a second conveying surface 80 of the second conveyor 78.

In addition, the conveying storage device 74 comprises a transfer device 81 for transferring containers 63 from the first 79 to the second conveying surface 80, a first separating element 82, and a second separating element 83. The containers are transferred here in an operating mode from the transfer device 81. The two separating elements 82, 83 can each be configured as railings or the like. The second separating element 83 can be dispensed with if, for example, there is little or no back pressure on the containers 63 upstream of the conveying storage device 74 or at the beginning of the first conveyor 76.

Containers 63 can be guided by means of the second separating element 83 from the second conveying surface 80 to another conveyor at the outlet of the conveying storage device 74. In order to prevent containers 63 from remaining when emptying during an emptying process of the conveying storage device 74 or to transfer the containers 63 safely from the first conveyor 76 to the second conveyor 78, a transfer element 84 (an embodiment of the additional element) is provided which can be introduced into a passage region 88. The passage region 88 exists along a transition region between the first conveying surface 79 and the second conveying surface 80 between the transfer device 81 and the second separating element 83.

The transfer element 84 is driven by a drive 85 to which it is connected by a connecting shaft 86. In addition, a sensor 87 is provided for detecting the presence of one or more containers 63 in the passage region 88, wherein the sensor 87 can be adapted to trigger a trigger mechanism of the transfer element 84 when one or more containers 63 are detected.

The drive 85 with the connecting shaft 86, the transfer element 84, and the sensor 87 are arranged on the transfer device 81 adjacent to the passage region 88. When the transfer element 84 is triggered, it pivots in the passage region 88, can thereby contact a container, e.g. on its outer surface, and during pivoting can transfer it to the second conveyor 78. After reaching an end position of the pivoting, the transfer element 84 can be pivoted back to its starting position.

FIG. 8A shows the conveying storage device 74 in an emptying process in which only one container remained on the first conveyor 76. This can be detected by the sensor 87.

Figure 8B:
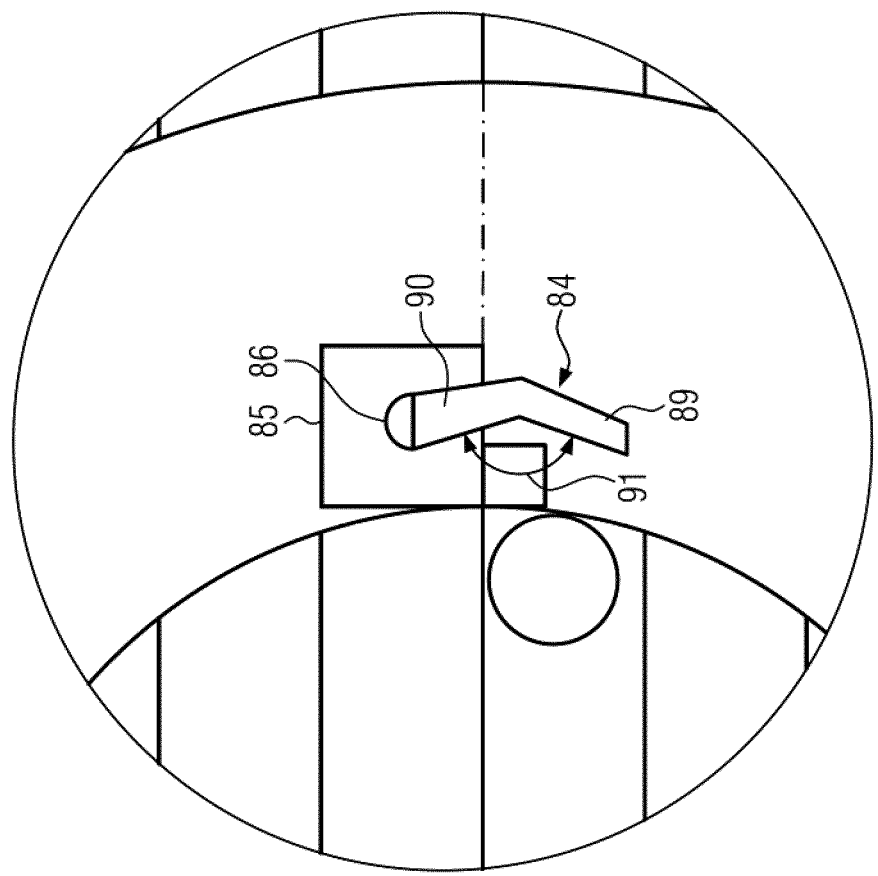
FIG. 8B shows an enlarged section of FIG. 8A.

FIG. 8B shows in an enlarged section of FIG. 8A the transition element 84. The transition element 84 consists of a first unit 89 and a second unit 90, wherein the two units 89, 90 enclose an angle of about 130°.

Figure 8C:
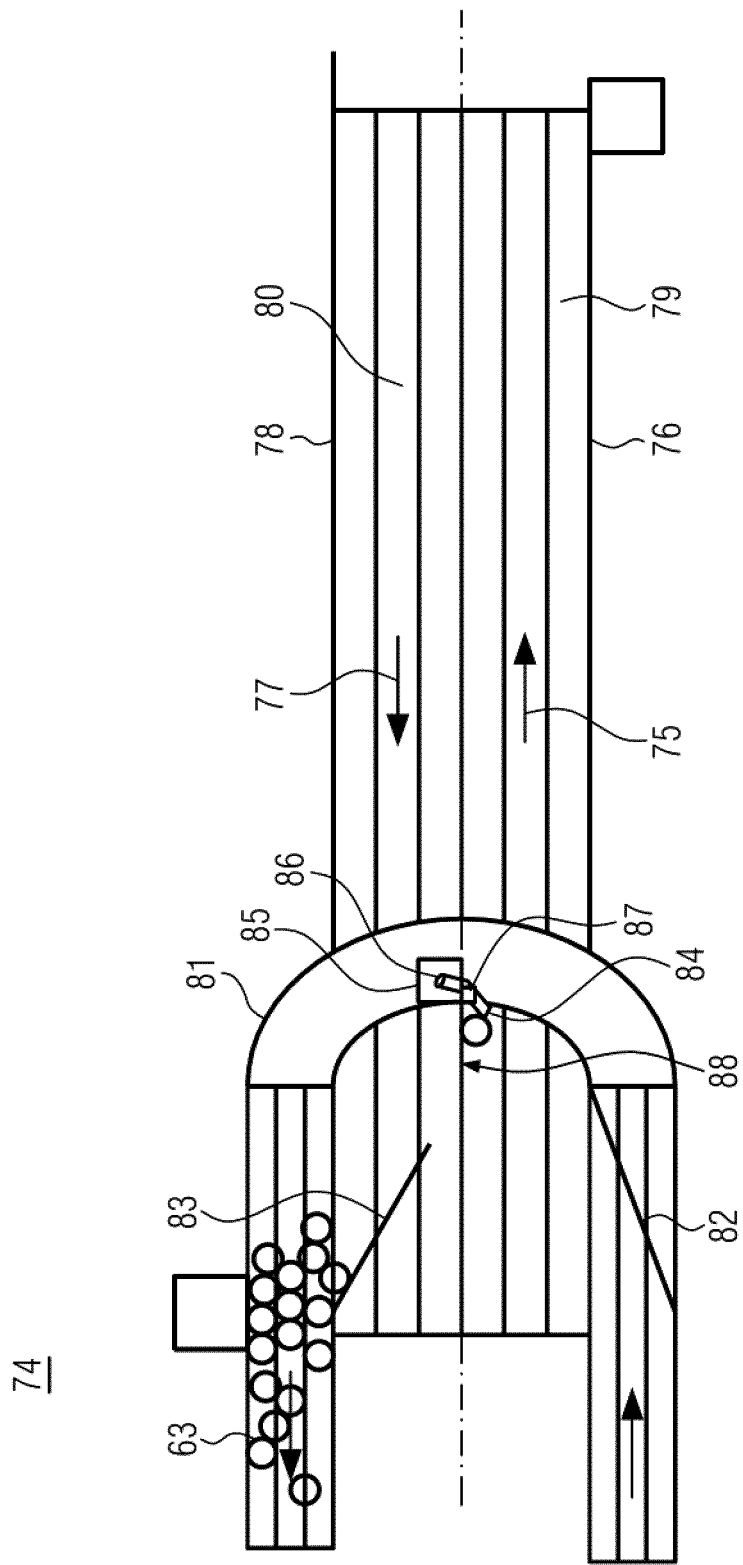
FIG. 8C shows the conveying storage device of FIG. 8A in a second operating state.

FIG. 8C shows the conveying storage device 74 of FIG. 8A in a second operating state in which the transfer element 84 has already been pivoted a bit from the starting position and has moved the container remaining on the first conveyor a bit from the first conveyor to the second conveyor.

Figure 8D:
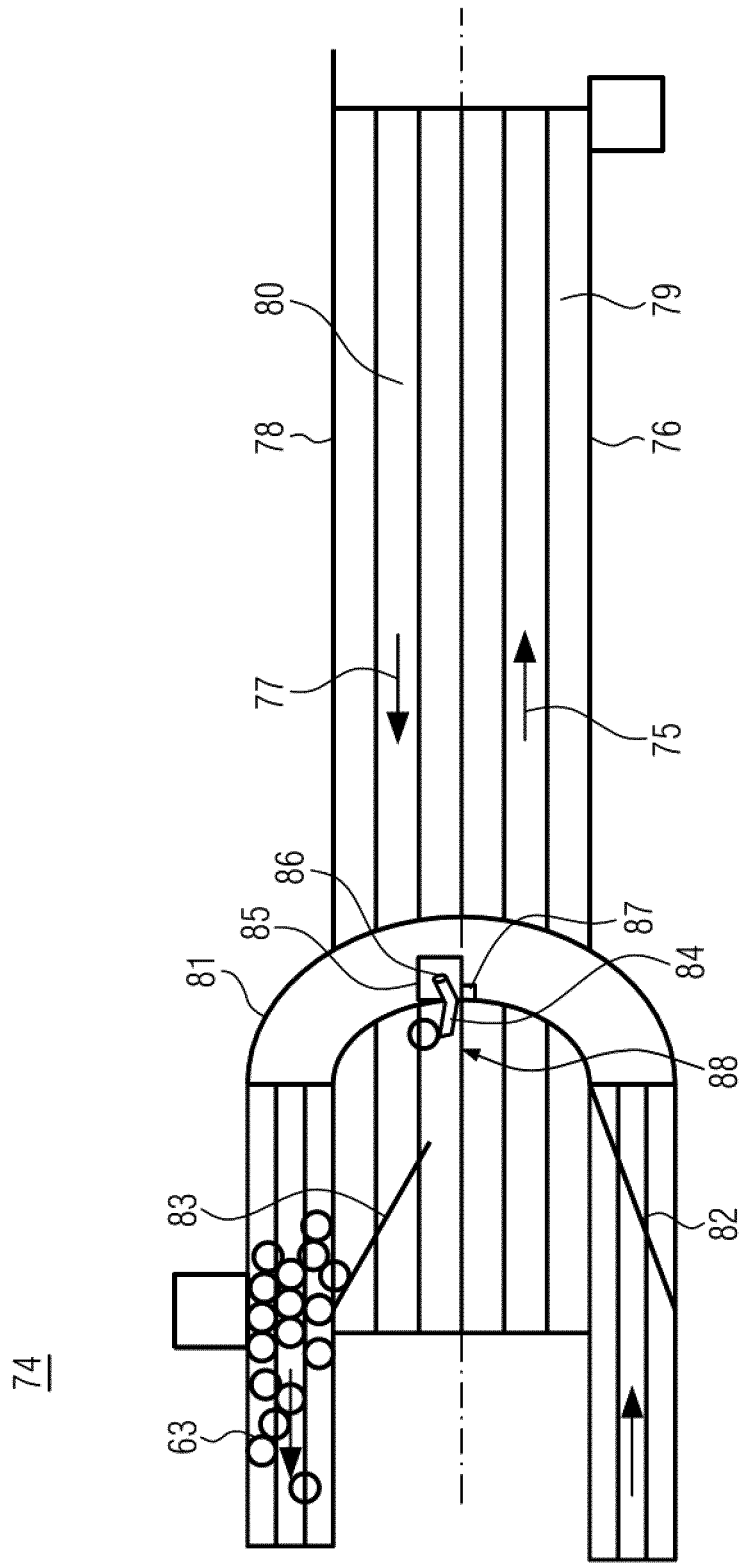
FIG. 8D shows the conveying storage device of FIG. 8A in a third operating state.

FIG. 8D shows the conveying storage device 74 of FIG. 8A in a third operating state in which the transfer element 84 was pivoted further to an end position and has moved the remaining container now completely to the second conveyor.

Figure 8E:
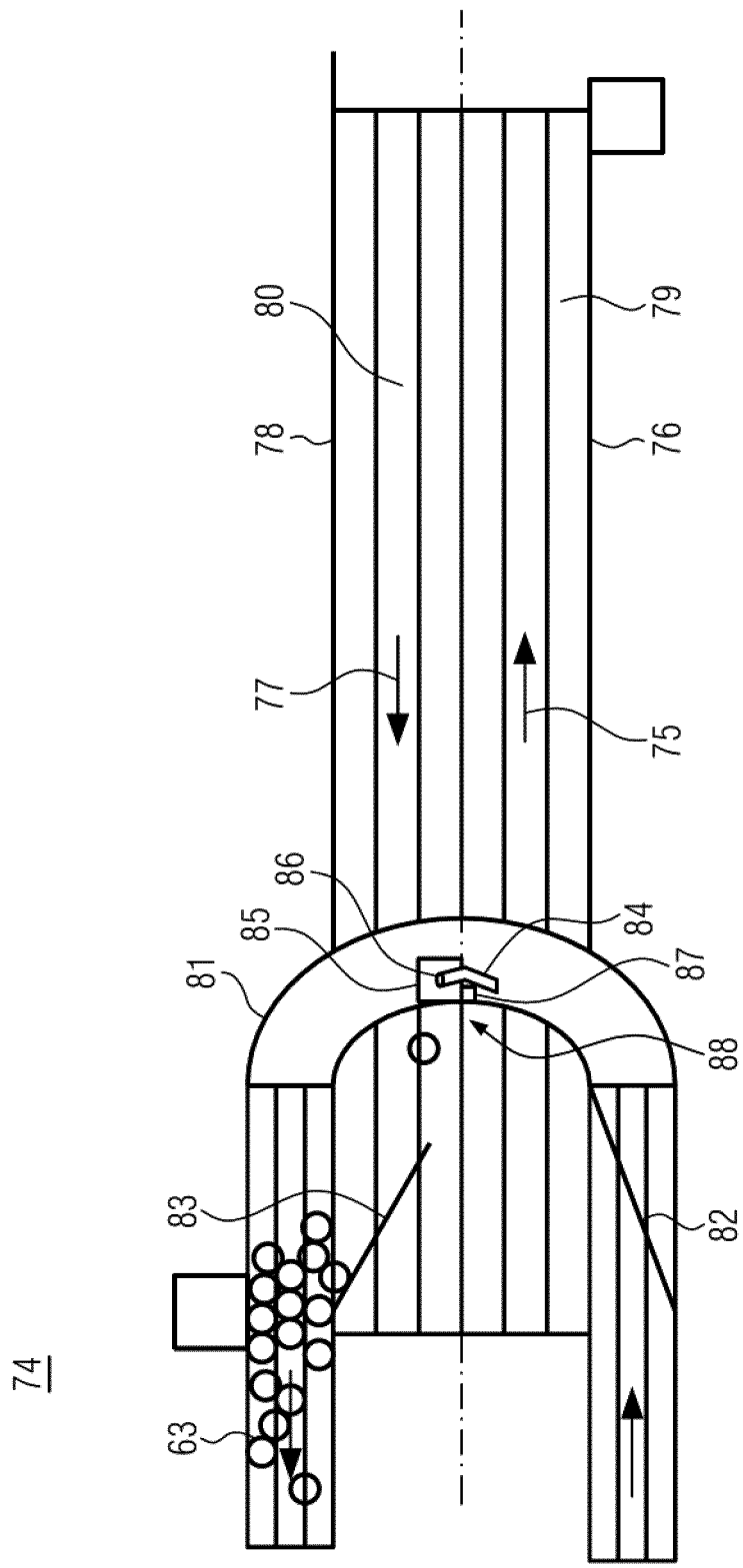
FIG. 8E shows the conveying storage device of FIG. 8A in a fourth operating state.

FIG. 8E shows the conveying storage device 74 of FIG. 8A in a fourth operating state in which the transfer element 84 was pivoted back to its starting position.

Some embodiments of the disclosure comprise the following features:

1. Conveying storage device (1, 26, 36, 45, 57, 72, 73) for containers (63), such as bottles or cans, comprising:

a first conveyor (3, 59) which is drivable in a first direction (2, 58), a second conveyor (5, 61) which is drivable in a second direction (4, 60), wherein the first direction (2, 58) and the second direction (4, 60) are opposite to each other a third conveyor (6, 62) which is drivable selectively in the first direction (2, 58) or in the second direction (4, 60) or is stationary and which is arranged between the first conveyor (3, 59) and the second conveyor (5, 61), wherein the first conveyor (3, 59), the second conveyor (5, 61) and the third conveyor (6, 62) are arranged parallel to one another such that containers (63) can be transferred from a first conveying surface (7, 64) of the first conveyor (3, 59) to a third conveying surface (8, 65) of the third conveyor (6, 62), and from there to a second conveying surface (9, 66) of the second conveyor (5, 61), a transfer device (10, 67) for transferring containers (63) from the first conveying surface (7, 64) to the third conveying surface (8, 65), and from there to the second conveying surface (9, 66), an additional element (12, 27, 37, 46, 69), wherein a passage region (13, 30, 44, 53) exists along the third conveying surface (8, 65) between the transfer device (10, 67) and the separating element (11, 29, 42, 47, 68), wherein the transfer device (10, 67) is movable into an emptying position during an emptying process of the conveying storage device (1, 26, 36, 45, 57, 72, 73), wherein the additional element (12, 27, 37, 46, 69) is adapted to be relatively movable in relation to the transfer device (10, 67) during the emptying process; and wherein the additional element (12, 27, 37, 46, 69) is introducible into the passage region (13, 30, 44, 53) or is arranged in the passage region during the emptying process and is adapted to transfer containers (63) from the third conveyor (6, 62) to the second conveyor (5, 61).

2. Conveying storage device according to embodiment 1, wherein the additional element (12, 27, 37, 46, 69) is enclosed by a separating element (11, 29, 42, 47, 68), wherein preferably the additional element (12, 27, 37, 46, 69) is configured such that it is movable relative to the separating element (11, 29, 42, 47, 68) during an emptying process.

3. Conveying storage device according to embodiment 1 or 2, wherein the additional element (12, 27, 37, 46, 69) comprises an elastic support and is lockable by means of the support, wherein preferably the additional element (12, 27, 37, 46, 69) or a part thereof at least partially consists of a resilient material or is resiliently mounted, wherein preferably the additional element (12, 27, 37, 46, 69) or a part thereof is at least partially moved in a direction of the force exerted by the containers (63) or the transfer device (10, 67) on the additional element (12, 27, 37, 46, 69) or the part thereof upon contact with containers (63) or upon contact with the transfer device (10, 67).

4. Conveying storage device according to one of embodiments 1 to 3, wherein the transfer device (10, 67) is in each case mounted laterally next to the conveying storage device and is movable by means of the mounting.

5. Conveying storage device according to one of embodiments 2 to 4, wherein the transfer device (10, 67) and the separating element (11, 29, 42, 47, 68) are arranged on the third conveyor (6, 62) and is movable correspondingly in the first direction (2, 58) or in the second direction (4, 60) by means thereof, wherein along the third conveying surface (8, 65) between the transfer device (10, 67) and the separating element (11, 29, 42, 47, 68) there is a passage region (13, 30, 44, 53) with a constant spacing (14, 35).

6. Conveying storage device according to one of embodiments 2 to 5, wherein an end portion (17, 33, 50) of the separating element (11, 29, 47) located in the second direction (4) has a chamfer, wherein preferably the separating element (11, 29, 47) is guided by means of a guide element (15, 31, 48), wherein preferably the guide element (15, 31, 48) comprises a chamfer at an end portion (16, 32, 49) located in the first direction (2).

7. Conveying storage device (1) according to one of embodiments 2 to 6, wherein the additional element comprises a shell (12) which at least partially surrounds the separating element (11) and which is movably mounted on the separating element (11), wherein the shell (12) is configured to be dimensionally stable, wherein preferably the end portion (19) of the shell (12) located in the first direction (2) has an end face (20) which extends perpendicularly to the third conveying surface (8) and forms an angle with the first direction (2), wherein preferably the shell (12) can be guided by means of the guide element (15).

8. Conveying storage device (1) according to embodiment 7, wherein the shell (12) comprises an actuator (22) with a magnet and an angled element, which is arranged on the shell (12), wherein preferably the actuator (22) is configured to be lockable by a pneumatic cylinder (23) and a further angled element (24) so that when the actuator (22) is locked, the shell (12) on the separating element (11) can be extended along the third conveying surface (8).

9. Conveying storage device (26) according to one of embodiments 2 to 6, wherein the additional element (27) is configured as a lever (28) which, when the transfer device (10) and the separating element (29) have been moved into the emptying position, is introducible into the passage region (30) and which is adapted to remove containers (63) in the passage region (30) laterally from the third conveying surface (8), wherein preferably the lever (28) is actuatable by means of a pneumatic cylinder.

10. Conveying storage device (36) according to one of embodiments 2 to 6, wherein the additional element comprises a first block (38), a second block (40), and at least one spring (39), wherein the first block (38) is spring-mounted to the second block (40) by means of the at least one spring (39), and wherein the separating element (42) extends through the first block (38) and through the second block (40).

11. Conveying storage device (36) according to embodiment 10, wherein the at least one spring (39) comprises a cover, wherein preferably an end portion (41) of the first block (38) located in the first direction (2, 58) has an end face (41*a*) which extends perpendicularly to the third conveying surface (8) and forms an angle with the first direction (2).

12. Conveying storage device (45) according to one of embodiments 2 to 6, wherein the additional element is configured as a rod (46), wherein the separating element (47) additionally comprises a through-hole (48) in which the rod (46) is movably arranged.

13. Conveying storage device (45) according to embodiment 12, wherein the rod (46) is spring-mounted with a pneumatic cylinder (56) and an angled element (55) and is lockable for a movement of the rod (46).

14. Conveying storage device (57, 72, 73) according to one of embodiments 1 to 5, wherein the additional element (69) is configured as a driven element (69), wherein preferably the additional element (69) is arranged on the transfer device (67) or on a structure (71) independent of the transfer device (67).

15. Conveying storage device (57, 72, 73) according to one of embodiments 2 to 5, wherein the separating element (68) is configured as a railing (68) and wherein the additional element (69) is configured as a driven element (69), wherein preferably the additional element (69) is arranged on the railing (68), on the transfer device (67) or on a structure (71) which is independent both of the railing (68) and of the transfer device (67).

16. Conveying storage device (57, 72, 73) according to embodiment 14 or 15, wherein the driven element (69) comprises its own drive.

17. Conveying storage device (57, 72, 73) according to embodiment 14 or 15, wherein the driven element (69) is coupled in a drivable manner to a drive of the third conveyor (62), wherein preferably a coupling is provided which is activated in the emptying process.

18. Conveying storage device (57, 72, 73) according to one of embodiments 14 to 17, wherein the driven element (69) comprises a brush (69), wherein the brush (69) is preferably rotatably configured and wherein the brush (69) preferably comprises elastic bristles.

19. A method for operating a conveying storage device (1, 26, 36, 45, 57, 72, 73) according to one of embodiments 1 to 18 during an emptying process comprising the following steps:
 driving the first conveyor (3, 59) in the first direction (2, 58),
 driving the second conveyor (5, 61) in the second direction (4, 60),
 driving the third conveyor (6, 62) in the second direction (4, 60) or non-driving the third conveyor (6, 62),
 moving the transfer device (10, 67) into the emptying position by moving it in the second direction (4, 60),
 during the emptying process, transporting containers (63) standing on the third conveyor (6, 62) in the second direction (4, 60) until they come into contact with the additional element (12, 27, 37, 46, 69) and are automatically transferred by means of the additional element (12, 27, 37, 46, 69) from the third conveyor (6, 62) onto the second conveyor (5, 61).

What is claimed is:

1. A conveying storage device for containers, comprising:
 a first conveyor which is drivable in a first direction;
 a second conveyor which is drivable in a second direction, wherein the first direction and the second direction are opposite to each other, wherein the first conveyor and the second conveyor are arranged parallel to each other such that the containers are transferable from a first conveying surface of the first conveyor to a second conveying surface of the second conveyor;
 a transfer device for transferring the containers from the first conveying surface to the second conveying surface;
 an additional element, wherein the additional element is configured as a transfer element, wherein the transfer element has a curved surface or wherein the transfer element comprises at least two units assembled at an angle of 120° to 180°;
 a separating element;
 wherein a passage region exists along a transition region between the first conveying surface and the second conveying surface between the transfer device and the separating element, wherein the transfer device is movable into an emptying position during an emptying process of the conveying storage device, wherein the additional element is relatively movable in relation to the transfer device during the emptying process, and wherein the additional element is introducible into the passage region or arranged in the passage region during the emptying process and is adapted to transfer containers to the second conveyor; and a drive for the transfer element, wherein a connecting shaft is provided which connects the drive and the transfer element, wherein a sensor is provided for a detection of a presence of one or more containers in the passage region, and wherein the sensor is adapted to trigger a trigger mechanism of the transfer element when one or more containers are detected.

2. The conveying storage device according to claim 1, further comprising:

a third conveyor which is drivable selectively in the first direction or in the second direction or is stationary, wherein the third conveyor is arranged between the first conveyor and the second conveyor, wherein the first conveyor, the second conveyor, and the third conveyor are arranged parallel to each other such that the containers are transferable from the first conveying surface of the first conveyor to a third conveying surface of the third conveyor, and from the third conveying surface of the third conveyor to the second conveying surface of the second conveyor;

wherein the passage region exists along the third conveying surface between the transfer device and the separating element; and wherein the additional element is adapted to move the containers from the third conveyor to the second conveyor.

3. The conveying storage device according to claim 2, wherein the additional element comprises an elastic support and is lockable by means of the elastic support, wherein the additional element or a part thereof consists at least partially of a resilient material or is spring-mounted, wherein the additional element or a part thereof is at least partially moved in a direction of a force exerted by the containers or the transfer device on the additional element or the part thereof upon contact with containers or upon contact with the transfer device.

4. The conveying storage device according to claim 2, wherein the transfer device is mounted laterally next to the conveying storage device and is movable by means of a mounting.

5. The conveying storage device according to claim 2, wherein the additional element is configured as a driven element, and wherein the additional element is arranged on the transfer device or on a structure independent of the transfer device.

6. The conveying storage device according to claim 5, wherein the driven element comprises its own drive.

7. The conveying storage device according to claim 5, wherein the driven element is coupled in a drivable manner to a drive of the third conveyor, wherein a coupling is provided which is activated in the emptying process.

8. The conveying storage device according to claim 1, wherein the transfer element is arranged on the transfer device, and wherein the drive, a connection shaft, and the sensor are arranged on the transfer device.

9. A conveying storage device for containers, comprising:
a first conveyor which is drivable in a first direction;
a second conveyor which is drivable in a second direction, wherein the first direction and the second direction are opposite to each other, wherein the first conveyor and the second conveyor are arranged parallel to each other such that the containers are transferable from a first conveying surface of the first conveyor to a second conveying surface of the second conveyor;

a third conveyor which is drivable selectively in the first direction or in the second direction or is stationary, wherein the third conveyor is arranged between the first conveyor and the second conveyor, wherein the first conveyor, the second conveyor, and the third conveyor are arranged parallel to each other such that the containers are transferable from the first conveying surface of the first conveyor to a third conveying surface of the third conveyor, and from the third conveying surface of the third conveyor to the second conveying surface of the second conveyor;

a transfer device for transferring the containers from the first conveying surface to the second conveying surface;

an additional element adapted to move the containers from the third conveyor to the second conveyor; and a separating element, wherein the additional element is enclosed by the separating element, wherein the additional element is configured such that it is movable relative to the separating element during an emptying process of the conveying storage device;

wherein a passage region exists along a transition region between the first conveying surface and the second conveying surface between the transfer device and the separating element, wherein the transfer device is movable into an emptying position during the emptying process of the conveying storage device, wherein the additional element is relatively movable in relation to the transfer device during the emptying process, and wherein the additional element is introducible into the passage region or arranged in the passage region during the emptying process and is adapted to transfer containers to the second conveyor; and wherein the passage region exists along the third conveying surface between the transfer device and the separating element.

10. The conveying storage device according to claim 9, wherein the transfer device and the separating element are arranged on the third conveyor and are movable by means thereof correspondingly in the first direction or in the second direction, wherein along the third conveying surface between the transfer device and the separating element the passage region exists with constant spacing.

11. The conveying storage device according to claim 9, wherein an end portion of the separating element located in the second direction has a first chamfer, wherein the separating element is guided by means of a guide element, and wherein the guide element comprises a second chamfer at an end portion located in the first direction.

12. The conveying storage device according to claim 11, wherein the additional element comprises a shell which at least partially surrounds the separating element and which is movably mounted on the separating element, wherein the shell is configured to be dimensionally stable, wherein an end portion of the shell located in the first direction has an end face which extends perpendicularly to the third conveying surface and forms an angle with the first direction, and wherein the guide element acts as a guide for the shell.

13. The conveying storage device according to claim 12, wherein the shell comprises an actuator with a magnet and an angled element which is arranged on the shell, wherein the actuator is configured such that it is lockable by a pneumatic cylinder and a further angled element, so that, when the actuator is locked, the shell is extendable on the separating element along the third conveying surface.

14. The conveying storage device according to claim 9, wherein the additional element is configured as a lever which, when the transfer device and the separating element have been moved into the emptying position, is introducible into the passage region and which is adapted to remove containers in the passage region laterally from the third conveying surface, wherein the lever can be actuated by means of a pneumatic cylinder.

15. The conveying storage device according to claim 9, wherein the additional element comprises a first block, a second block, and at least one spring, wherein the first block is connected to the second block in a spring-loaded manner by means of the at least one spring, and wherein the separating element extends through the first block and through the second block.

16. The conveying storage device according to claim 15, wherein the at least one spring comprises a cover, wherein an end portion of the first block located in the first direction has an end face which extends perpendicularly to the third conveying surface and forms an angle with the first direction.

17. The conveying storage device according to claim 9, wherein the additional element is configured as a rod, and wherein the separating element further comprises a through-hole in which the rod is movably arranged.

18. The conveying storage device according to claim 17, wherein the rod is spring-mounted with a pneumatic cylinder and an angled element and is lockable for a movement of the rod.

19. The conveying storage device according to claim 9, wherein the separating element is configured as a railing, wherein the additional element is configured as a driven element, and wherein the additional element is arranged on the railing, on the transfer device or on a structure which is independent of both the railing and the transfer device.

20. A conveying storage device for containers, comprising:
   a first conveyor which is drivable in a first direction;
   a second conveyor which is drivable in a second direction, wherein the first direction and the second direction are opposite to each other, wherein the first conveyor and the second conveyor are arranged parallel to each other such that the containers are transferable from a first conveying surface of the first conveyor to a second conveying surface of the second conveyor;
   a third conveyor which is drivable selectively in the first direction or in the second direction or is stationary, wherein the third conveyor is arranged between the first conveyor and the second conveyor, wherein the first conveyor, the second conveyor, and the third conveyor are arranged parallel to each other such that the containers are transferable from the first conveying surface of the first conveyor to a third conveying surface of the third conveyor, and from the third conveying surface of the third conveyor to the second conveying surface of the second conveyor;
   a transfer device for transferring the containers from the first conveying surface to the second conveying surface;
   an additional element configured as a driven element and adapted to move the containers from the third conveyor to the second conveyor, wherein the additional element is arranged on the transfer device or on a structure independent of the transfer device, and wherein the driven element comprises a brush, wherein the brush is rotatably configured, and wherein the brush comprises elastic bristles; and
   a separating element;
   wherein a passage region exists along a transition region between the first conveying surface and the second conveying surface between the transfer device and the separating element, wherein the transfer device is movable into an emptying position during an emptying process of the conveying storage device, wherein the additional element is relatively movable in relation to the transfer device during the emptying process, and wherein the additional element is introducible into the passage region or arranged in the passage region during the emptying process and is adapted to transfer containers to the second conveyor; and
   wherein the passage region exists along the third conveying surface between the transfer device and the separating element.

* * * * *